(12) United States Patent
Sugiura

(10) Patent No.: US 11,748,059 B2
(45) Date of Patent: Sep. 5, 2023

(54) SELECTING OPTIONS BY UTTERED SPEECH

(71) Applicant: Saturn Licensing LLC, New York, NY (US)

(72) Inventor: Shunichi Sugiura, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/311,084

(22) PCT Filed: Nov. 21, 2019

(86) PCT No.: PCT/JP2019/045714
§ 371 (c)(1),
(2) Date: Jun. 4, 2021

(87) PCT Pub. No.: WO2020/121776
PCT Pub. Date: Jun. 18, 2020

(65) Prior Publication Data
US 2022/0043627 A1  Feb. 10, 2022

(30) Foreign Application Priority Data
Dec. 11, 2018  (JP) .................. 2018-231615

(51) Int. Cl.
*H04N 5/445* (2011.01)
*G06F 3/00* (2006.01)
(Continued)

(52) U.S. Cl.
CPC .............. *G06F 3/167* (2013.01); *G10L 15/22* (2013.01); *H04N 21/4394* (2013.01); *H04N 21/472* (2013.01); *G10L 2015/223* (2013.01)

(58) Field of Classification Search
CPC ............. H04N 21/472; H04N 21/4394; H04N 21/4828; H04N 21/42203; G06F 3/167; H04H 60/43; H04H 60/44
See application file for complete search history.

(56) References Cited

U.S. PATENT DOCUMENTS 7,792,828 B2 * 9/2010 Roegner .......... H04N 21/47202
707/723
2005/0172319 A1  8/2005 Reichardt et al.
(Continued)

FOREIGN PATENT DOCUMENTS

JP  2000244838 A  9/2000
JP  2004096530 A  3/2004
(Continued)

OTHER PUBLICATIONS

International Search Report for Application No. PCT/JP2019/045714, dated Jan. 21, 2020, 3 pages.

*Primary Examiner* — Gigi L Dubasky
(74) *Attorney, Agent, or Firm* — Jeffery J Brosemer

(57) ABSTRACT

A receiving apparatus includes a control unit that performs a process of searching for one of a channel and a content on the basis of a phrase that is recognized from an uttered speech of a user, a process of selecting one of a single channel and a single content from among a plurality of channels and a plurality of contents obtained through the search process, a process of displaying, on a display unit, one of the selected content and a content that is being broadcasted on the selected channel, and a process of displaying, as options, item images representing a plurality of channels or a plurality of contents that are obtained through the search process on the display unit.

26 Claims, 12 Drawing Sheets

(51) Int. Cl.
    *G06F 13/00*     (2006.01)
    *G06F 3/16*     (2006.01)
    *G10L 15/22*     (2006.01)
    *H04N 21/439*     (2011.01)
    *H04N 21/472*     (2011.01)

(56) References Cited

U.S. PATENT DOCUMENTS

| | | | |
|---|---|---|---|
| 2007/0118382 A1* | 5/2007 | Kuboyama | G10L 15/22 704/E15.04 |
| 2008/0098433 A1 | 4/2008 | Hardacker et al. | |
| 2012/0259639 A1* | 10/2012 | Yeh | G06F 3/04842 704/E15.001 |
| 2013/0024197 A1 | 1/2013 | Jang et al. | |
| 2014/0181865 A1 | 6/2014 | Koganei | |
| 2014/0195244 A1 | 7/2014 | Cha et al. | |
| 2014/0196091 A1* | 7/2014 | Shin | G10L 15/26 725/53 |
| 2015/0382047 A1* | 12/2015 | Van Os | H04N 21/25891 725/38 |
| 2017/0214960 A1* | 7/2017 | Kim | H04N 21/8405 |
| 2019/0147058 A1* | 5/2019 | Lu | H04L 67/22 707/727 |
| 2019/0281341 A1* | 9/2019 | Lawrence | H04N 21/41265 |
| 2019/0342727 A1* | 11/2019 | Park | H04W 4/20 |

FOREIGN PATENT DOCUMENTS

| | | | |
|---|---|---|---|
| JP | 2015095002 A | 5/2015 | |
| JP | 2016029495 A | 3/2016 | |

* cited by examiner

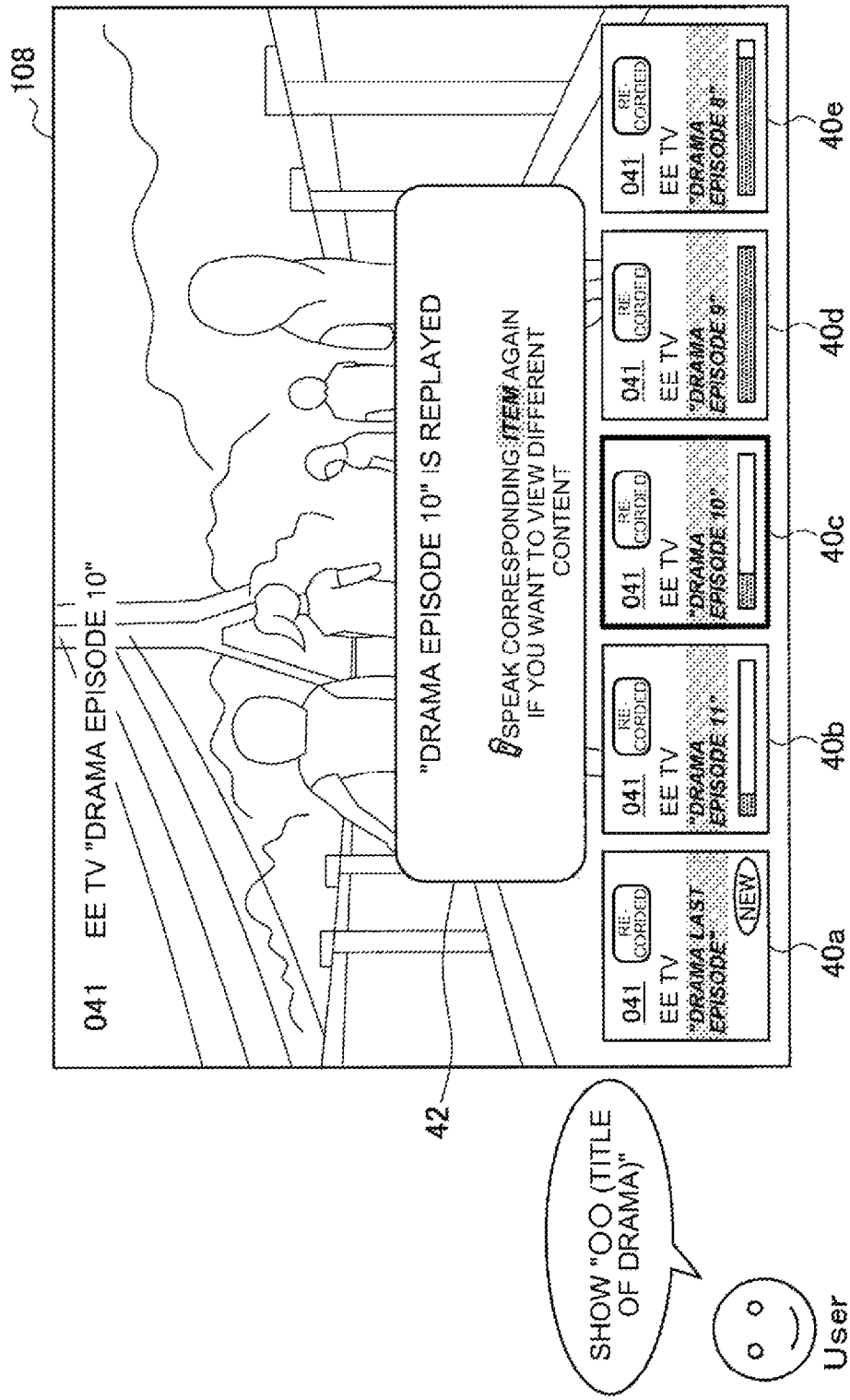

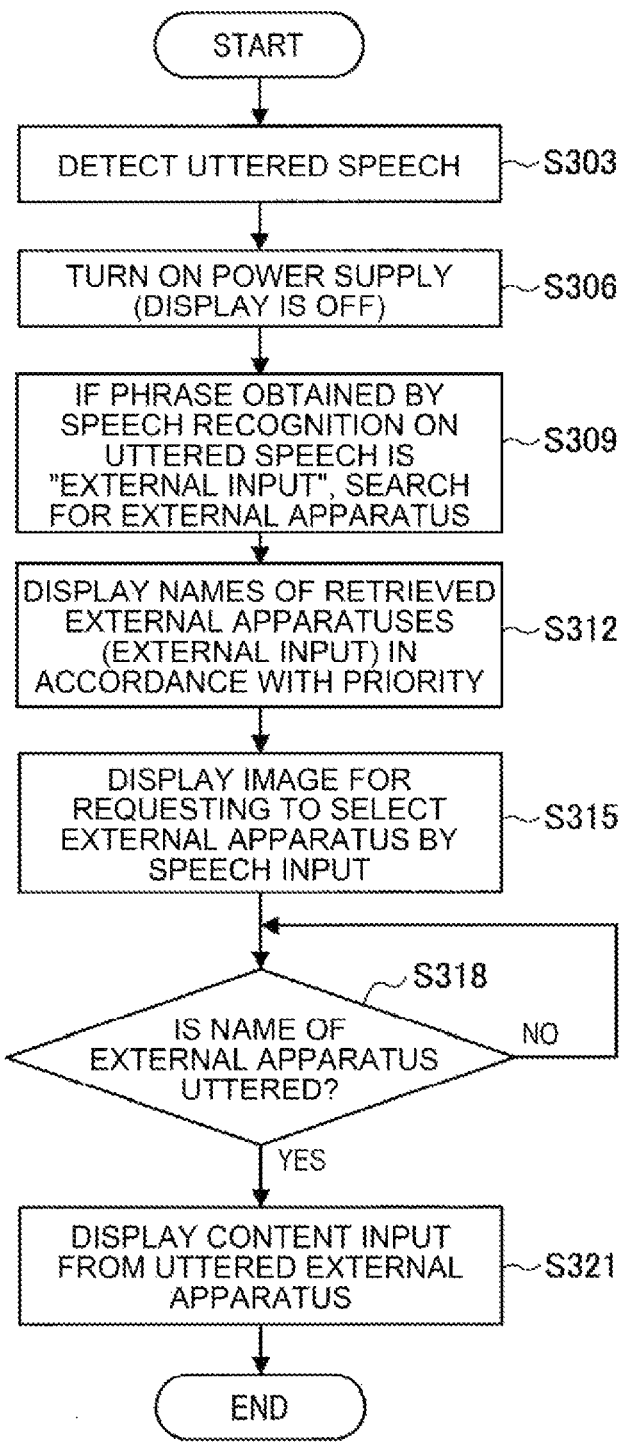

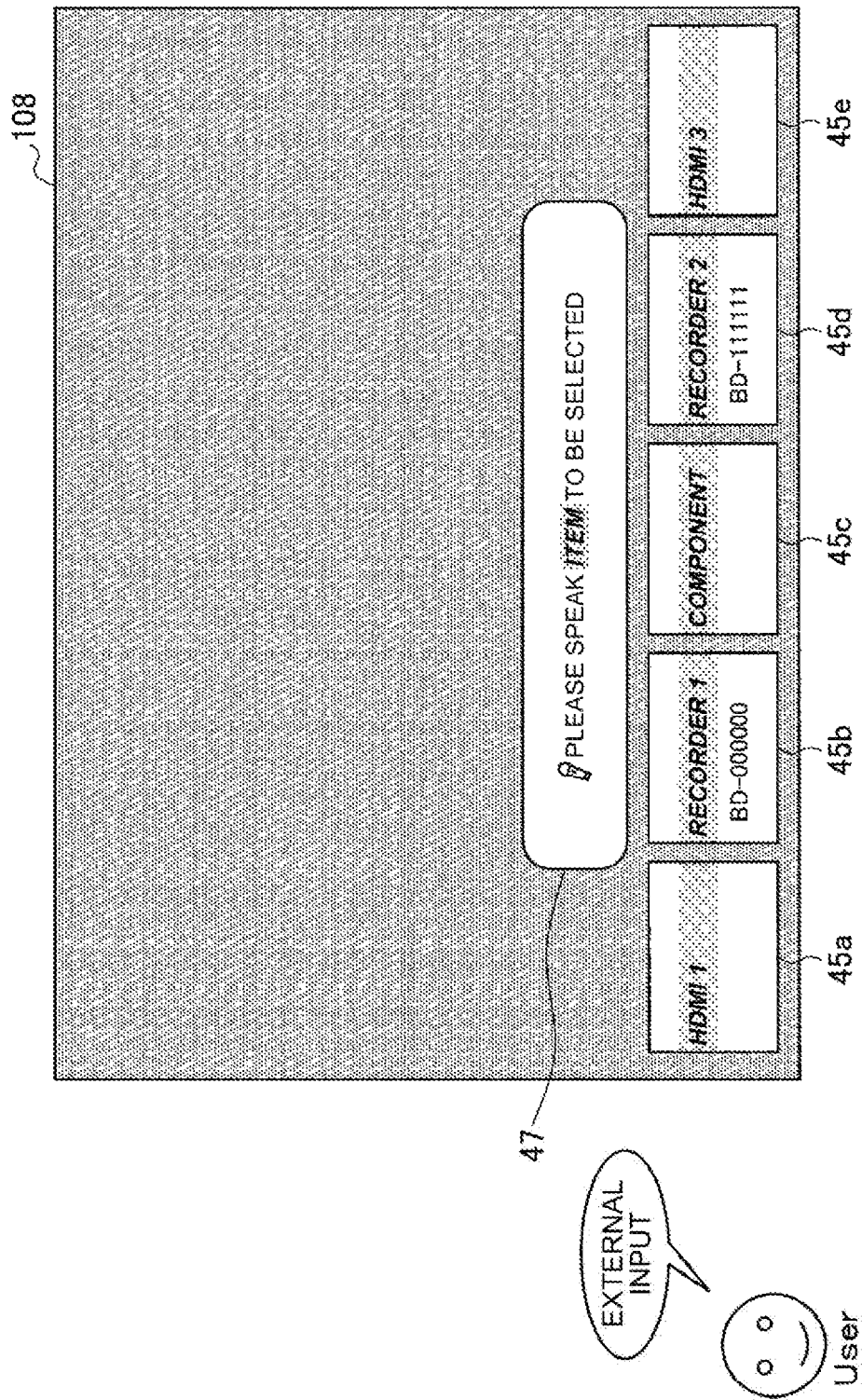

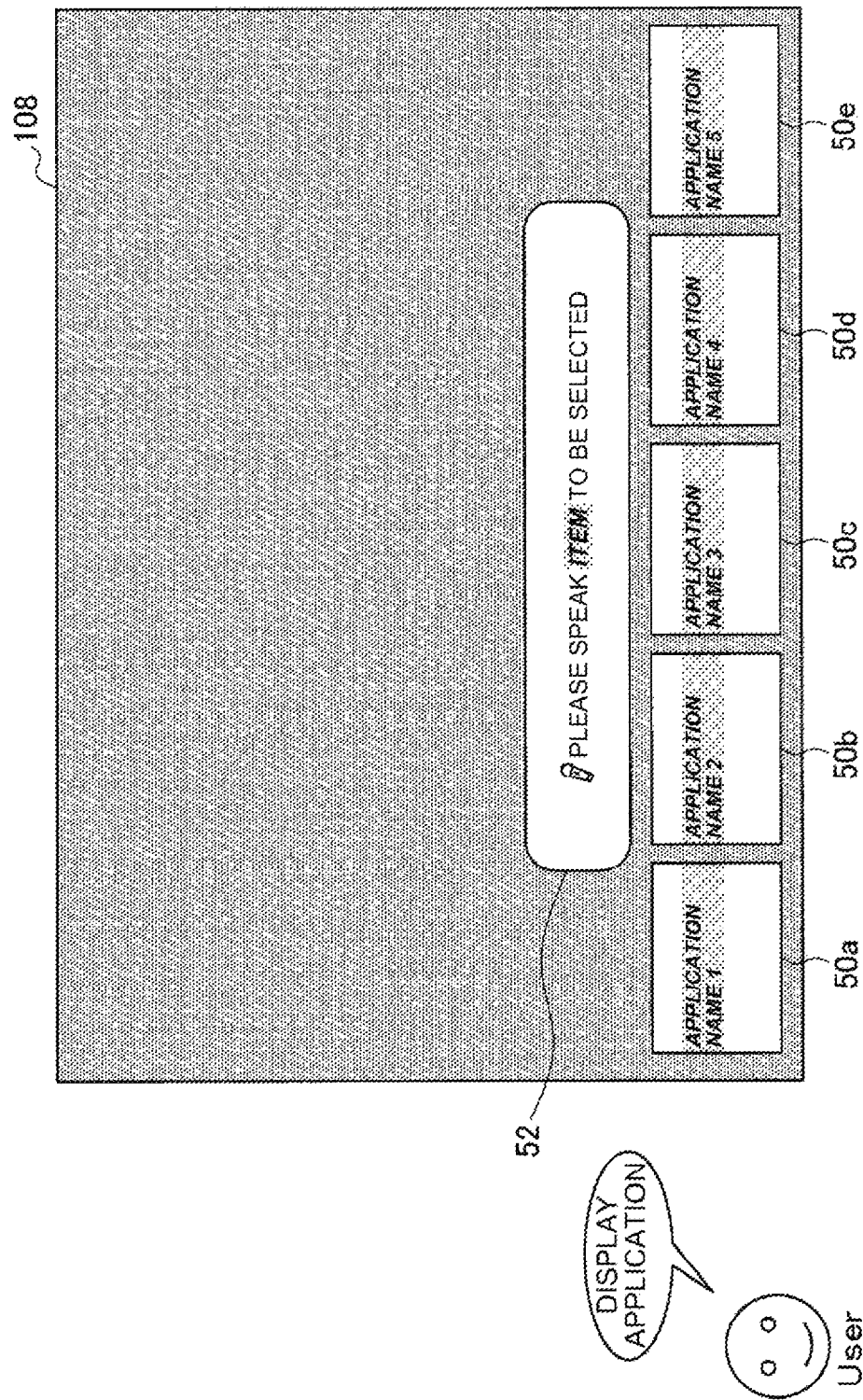

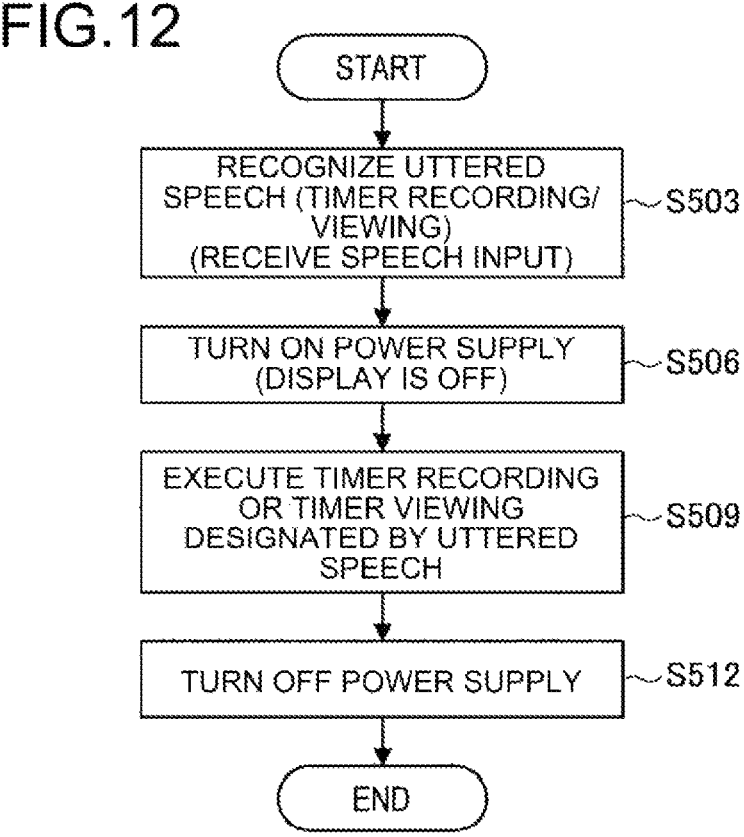
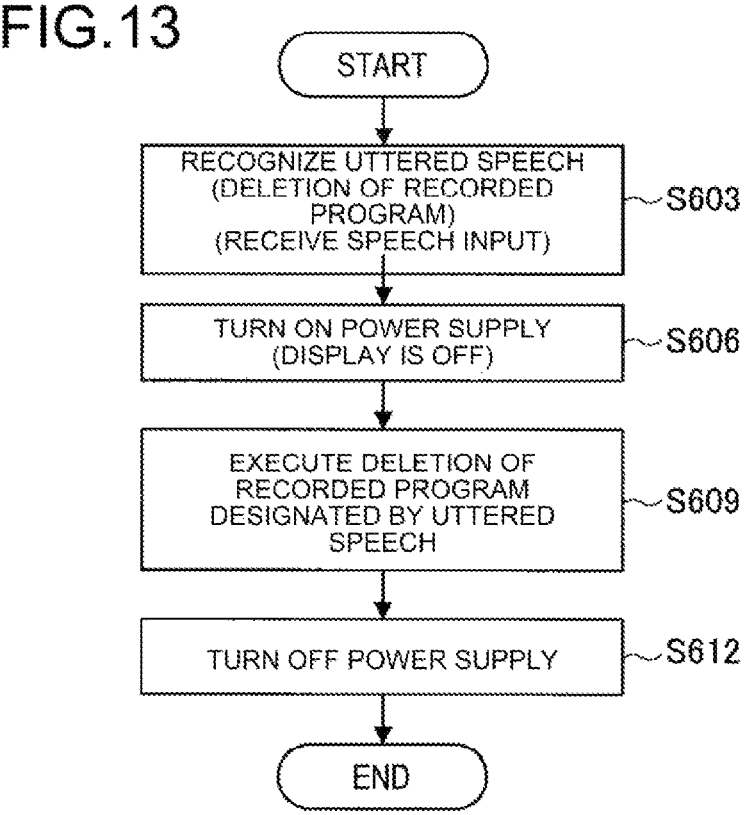

SELECTING OPTIONS BY UTTERED SPEECH

CROSS-REFERENCE TO RELATED APPLICATIONS

This application is a national phase entry under 35 U.S.C. § 371 of International Application No. PCT/JP2019/045714 filed Nov. 21, 2019, which claims the priority from Japanese Patent Application No. 2018-231615 filed in the Japanese Patent Office on Dec. 11, 2018, the entire contents of which are hereby incorporated by reference.

FIELD

The present disclosure relates to a receiving apparatus and a control method.

BACKGROUND

Conventionally, speech recognition is used as a technology for supporting input from a user to an information equipment. For example, Patent Literature 1 listed below discloses a technology of a display control apparatus that performs speech recognition on a content of speech uttered by a user, identifies a speech command, and performs a process.

CITATION LIST

Patent Literature

Patent Literature 1: JP 2015-95002 A

SUMMARY

Technical Problem

Here, if a plurality of options are present with respect to the content uttered by the user and that is subjected to the speech recognition, it is difficult to determine which of the options certainly meets a requirement of the user.

In Patent Literature 1 as described above, it is possible to identify, from a plurality of options corresponding to speech input, an option of interest in accordance with a certain criterion determined in advance, identify others as alternative options, and display the option of interest with a larger size than the other options to indicate that the option is selected.

However, in Patent Literature 1 as described above, when the option is to be executed, it is necessary to input speech representing a phrase, such as "start", again, so that a step from selection to execution may be cumbersome.

Solution to Problem

According to the present disclosure, a receiving apparatus is provided that includes: a control unit that performs a search process of searching for one of a channel and a content on the basis of a phrase that is recognized from an uttered speech of a user, a process of selecting one of a single channel and a single content from among a plurality of channels and a plurality of contents obtained through the search process, a process of displaying, on a display unit, one of the selected content and a content that is being broadcasted on the selected channel, and a process of displaying, as options, item images representing a plurality of channels or a plurality of contents that are obtained through the search process on the display unit.

According to the present disclosure, a control method implemented by a processor is provided, the control method including: searching for one of a channel and a content on the basis of a phrase that is recognized from an uttered speech of a user; selecting one of a single channel and a single content from among a plurality of channels and a plurality of contents obtained at the searching; displaying, on a display unit, one of the selected content and a content that is being broadcasted on the selected channel; and displaying, as options, item images representing a plurality of channels or a plurality of contents that are obtained at the searching on the display unit.

BRIEF DESCRIPTION OF DRAWINGS

FIG. 8 is a diagram for explaining a display example in a case where speech input of a title of sequential contents, such as a drama, is performed according to a sixth example of the present embodiment.

FIG. 9 is a flowchart illustrating an example of the flow of an operation process in a case where speech input for designating external input is performed according to a seventh example of the present embodiment.

FIG. 10 is a diagram illustrating an example of a screen that displays search results that are obtained when speech input for designating the external input is performed according to the seventh example of the present embodiment.

FIG. 11 is a diagram illustrating an example of a screen that displays search results that are obtained when speech input related to activation of an application or the like is performed according to an eighth example of the present embodiment.

FIG. 12 is a flowchart illustrating an example of the flow of an operation process for setting timer recording or timer viewing when a power supply is turned off according to a ninth example of the present embodiment.

FIG. 13 is a flowchart illustrating an example of the flow of an operation process for deleting a content when a power supply is turned off according to the ninth example of the present embodiment.

DESCRIPTION OF EMBODIMENTS

Preferred embodiments of the present disclosure will be described in detail below with reference to the accompanying drawings. In the present specification and the drawings, structural elements having substantially the same functions and configurations are denoted by the same reference symbols, and repeated explanation will be omitted.

In addition, hereinafter, explanation will be given in the following order.
1. Overview
2. Configuration example
    2-1. Hardware configuration example
    2-2. Functional configuration example
3. Examples
    3-1. First example: speech input of "channel name"
    3-2. Second example: simultaneous display of currently broadcasted program and recorded program
    3-3. Third example: speech input of "current program"
    3-4. Fourth example: speech input of "genre"
    3-5. Fifth example: speech input for asking for a recommended content or the like
    3-6. Sixth example: display of sequential contents
    3-7. Seventh example: speech input for designating external input (example of speech input of "HDMI")
    3-8. Eighth example: speech input related to activation of application or the like
    3-9. Ninth example: "timer recording/viewing, content deletion" when power supply is turned off
    3-10. Supplemental explanation
4. Conclusion

1. Overview

Figure 1:
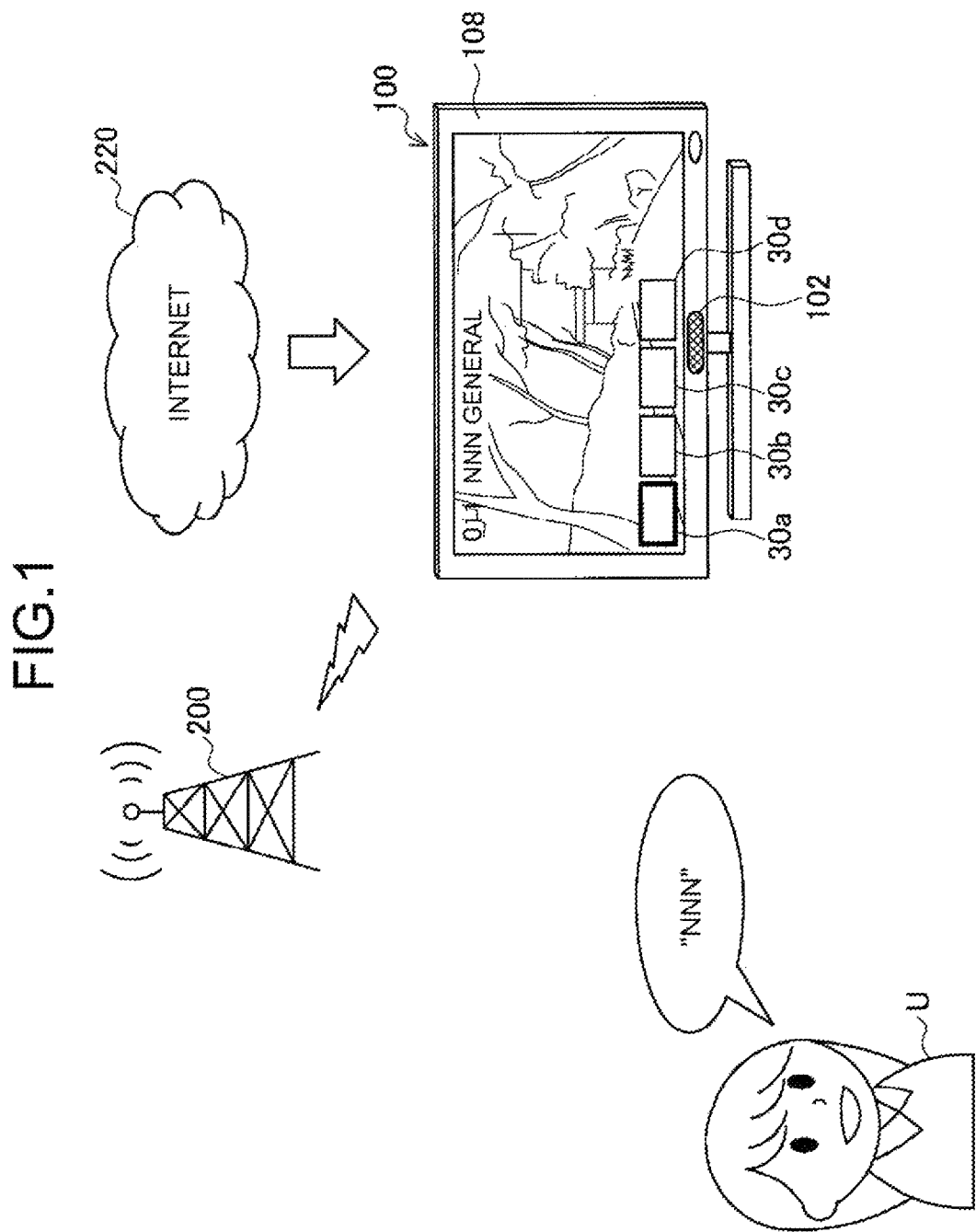
FIG. 1 is an explanatory diagram for explaining an overview of an information processing apparatus according to one embodiment of the present disclosure.

In this section, an overview of an information processing apparatus to which the technology according to the present disclosure may be applied will be described with reference to FIG. 1. FIG. 1 is a diagram for explaining an overview of an information processing apparatus 100 according to one embodiment of the present disclosure. With reference to FIG. 1, the information processing apparatus 100 is a receiving apparatus that receives a broadcast signal that is broadcasted from a broadcast tower 200 by each of broadcast stations, or content data that is distributed via Internet 220 (specifically, a content distribution server that is communicably connected via the Internet), and is what is called a television apparatus that includes a display 108. Meanwhile, the information processing apparatus 100 (receiving apparatus) is not limited to a television apparatus, but may be a smartphone, a projector, a car navigation system, or an external apparatus, such as a recorder with a record and replay function or a player with a replay function, which is connected to the television apparatus.

In the following, an example will be explained in which the information processing apparatus 100 is a television apparatus.

The information processing apparatus 100 includes a microphone 102 and the display 108. The microphone 102 collects speech uttered by a user. The display 108 displays an image generated by the information processing apparatus 100. The image displayed by the display 108 may include a user interface (UI) image in addition to a content image.

In the example in FIG. 1, a user U utters a phrase of "NNN" that is a name of a channel. The information processing apparatus 100 recognizes the speech uttered by the user, searches for a channel on the basis of the phrase of "NNN", and switches to a single channel, such as "NNN General", that is selected from search results. The display 108 displays a video of a program that is currently broadcasted on "NNN General". A selection of an option from a plurality of search results may be determined in accordance with predetermined priority. For example, when the user U inputs speech of "show "NNN" (channel name)", and if a plurality of channels, such as "NNN General", "NNN 1", "NNN AA", and "NNN premium", are present as channels of "NNN", the information processing apparatus 100 selects a channel that is most likely to be viewed by the user U on the basis of the predetermined priority and automatically changes a display screen, so that it is possible to meet a request of the user U as much as possible even if a plurality of options for selection are present. The name of the channel is not limited to the example of "NNN", and may include all of names including an official name and an abbreviated name of each of broadcast station, by which channels can be identified.

If it is possible to identify a viewing user by, for example, speech recognition, face recognition (image recognition), or user information, such as account information, the information processing apparatus 100 may calculate priority of each of search results on the basis of preference information or a viewing history of the user, and select a channel with the highest priority.

Furthermore, after automatically selecting a channel from the search results and switching to the channel, the information processing apparatus 100 displays, on the screen, item images 30 (30a to 30d) indicating a name or the like of each of the channels (selection items) based on the search results. If the channel that is automatically selected by the information processing apparatus 100 meets an expectation of the user, a problem can hardly occur, but if the channel is different from a channel requested by the user, it is expected that the user may immediately reselect a channel. Therefore, the information processing apparatus 100 according to the present embodiment displays the item images 30a to 30d that indicate the search results (for example, names of retrieved channels) in order of priority or the like, and makes it possible to support speech input when the user changes a channel. For example, the item images 30a to 30d may be displayed for a predetermined time (for example, for several seconds) and may be deleted without any operation when a time-out occurs after a lapse of the predetermined time. The user is able to refer to reading items displayed on the item images 30, input speech of a more accurate name again, and switch to a desired channel (for example, "NNN 1", "NNN AA", or the like that is a different option for selection, instead of the automatically selected "NNN General").

Furthermore, the information processing apparatus 100 may display, on the display 108, an image for requesting input when a different channel is selected (not illustrated in FIG. 1) together with the item images (30a to 30d). In the image for requesting input, for example, it may be possible to request the user to perform cursor input using a remote controller or a smartphone, or request speech input by a microphone icon or the like. Moreover, it may be possible to display a descriptive text, such as "speak a corresponding item again if you want to view a different channel". Furthermore, by matching a portion of the "corresponding item" in the descriptive text with display modes of the reading items displayed on the item images 30, it is possible to allow the user to intuitively recognize the items that need to be read.

The information processing apparatus 100 is able to record a viewing history and preference information together with the user information and time information with respect to the channel selected by the user, and improve accuracy of automatic channel selection.

In the example in FIG. 1, a case has been described in which when a channel name is input by speech, a channel search (in other words, a program search) is performed, but the present disclosure is not limited to this example, and even if abstract speech input, such as "show recommendations", is performed in addition to speech input for designating a program name, a genre, an application name, or an external input device name, it may be possible to search for a content, such as a broadcast program, a recorded program, an Internet-distributed program, or an application.

As described above, the information processing apparatus 100 according to the present disclosure searches for a content in accordance with speech input from a user, and if a plurality of contents are retrieved, the information processing apparatus 100 automatically selects a content that is highly likely to be requested by the user in accordance with a predetermined criterion, displays the content on the display 108, and displays item images representing search results. Meanwhile, the item images representing the search results may be provided by, for example, displaying information that contains only text on a content image in an overlaid manner.

With this configuration, when speech is input, and even if a plurality of options for selection are present, it is possible to automatically select and display (that is, execute) a content, so that it is possible to omit a time and effort of the user, and, by displaying search results as items of the options for selection, it is possible to support speech input when the user selects a different option and meet a request of the user as much as possible. Furthermore, it may be possible to display, as an UI image for supporting speech input, an image for requesting speech input of a reading item, so that it is possible to prevent reading that may be hard to recognize or unclear reading.

Moreover, in a standby state in which at least speech detection by the microphone 102 is available (in other words, power is supplied to a processor 112 and the microphone 102) and the display 108 is turned off (in other words, power is not supplied to the display 108), if speech input of a request (content search) of the user is recognized, the information processing apparatus 100 may perform operation of automatically turning on a power supply of the information processing apparatus 100 (turning on at least the display 108). As the recognition of the speech input of the request of the user, when a predetermined call, such as an agent name, is given, it may be possible to recognize a phrase (a search word, such as designation of a channel name, a program name, a genre, or the like) that follows the predetermined call. Then, the information processing apparatus 100 performs a content search on the basis of the phrase that is subjected to speech recognition, and if a plurality of options are retrieved, the information processing apparatus 100 displays a content that is selected in accordance with a predetermined criterion on the display 108 and also displays item images representing search results on the display 108. In this manner, by inputting speech of a content search, it is possible to automatically turn on the power supply of the information processing apparatus 100.

In the present embodiment, as one example, the information processing apparatus 100 performs a speech recognition process, but the present disclosure is not limited to this example, and the speech recognition process may be performed by an external apparatus (a local terminal, such as a smart speaker, a smartphone, a tablet terminal, or a personal computer (PC), or a server or the like on the Internet) that is connected to the information processing apparatus 100.

Furthermore, in the present embodiment, as one example, the microphone 102 is arranged in the information processing apparatus 100, but the present invention is not limited to this example, and the microphone 102 may be arranged in an external apparatus (an audio terminal, such as a smart speaker, or a mobile terminal, such as a smartphone) or a remote controller that is connected to the information processing apparatus 100. The external apparatus, such as an audio terminal, may perform control of detecting speech of a user, performing a speech recognition process, and automatically turning on the power supply of the information processing apparatus 100, or may perform control of transmitting the detected speech of the user to a server on a network, causing the server to perform a speech recognition process, and automatically turning on the power supply of the information processing apparatus 100 on the basis of a recognition result. Moreover, an input device, such as a remote controller may perform a process of receiving speech input and transmitting the received user's utterance information to the information processing apparatus 100, and, the information processing apparatus 100 may perform a process of performing a speech recognition process or transmitting the information to a server. The information processing apparatus 100 performs a content search on the basis of a speech recognition result, and if a plurality of options are retrieved, the information processing apparatus 100 displays, on the display 108, a content that is selected in accordance with a predetermined criterion and also displays, on the display 108, item images representing search results. A process of starting to receive speech and perform speech recognition may be started by using a button or an icon that is arranged on a device, such as a remote controller or a smartphone.

2. Configuration Example 2-1. Hardware Configuration Example

Figure 2:
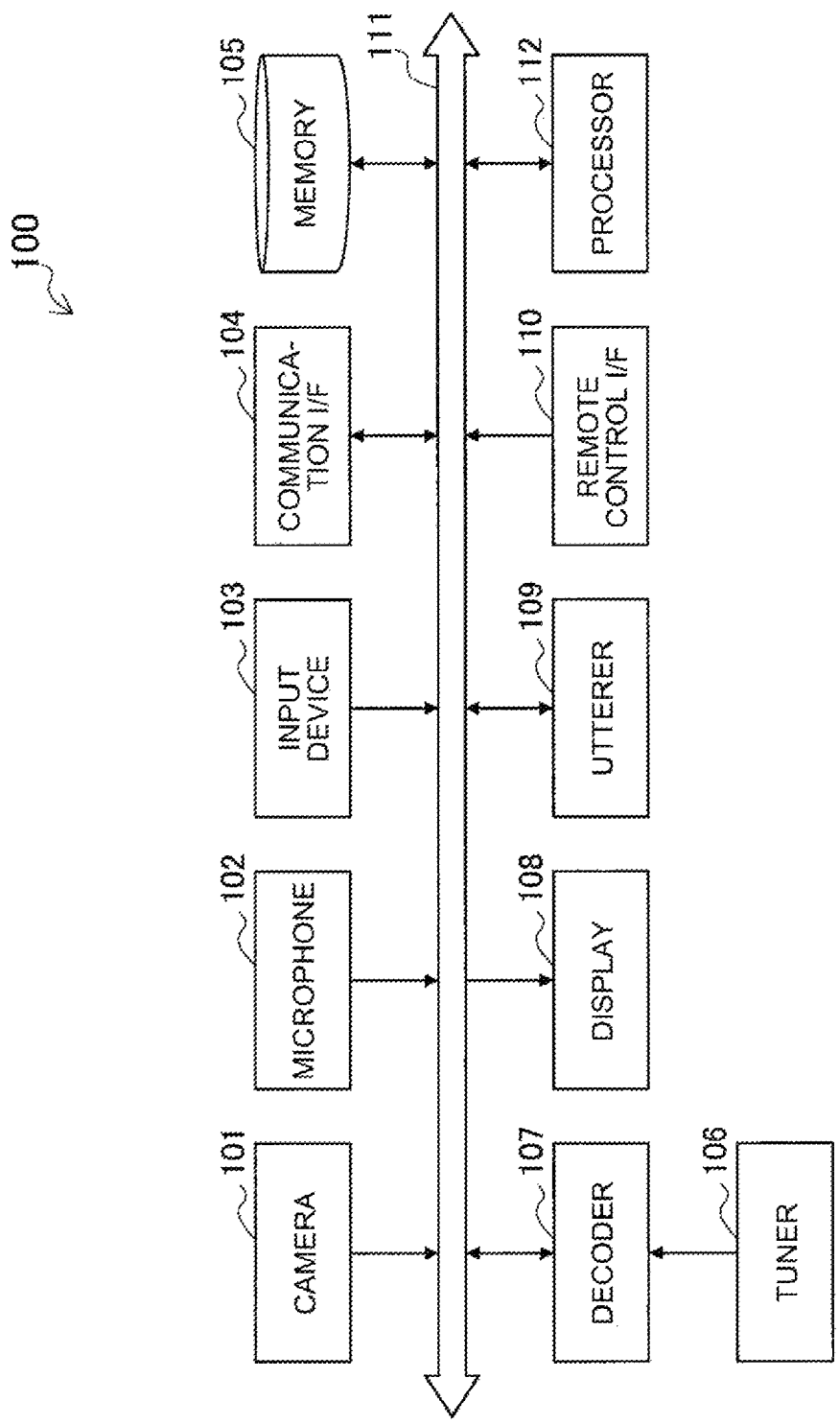
FIG. 2 is a block diagram illustrating an example of a hardware configuration of the information processing apparatus according to one embodiment.

FIG. 2 is a block diagram illustrating an example of a hardware configuration of the information processing apparatus 100. With reference to FIG. 2, the information processing apparatus 100 includes a camera 101, the microphone 102, an input device 103, a communication interface (I/F) 104, a memory 105, a tuner 106, a decoder 107, the display 108, an utterer 109, a remote control I/F 110, a bus 111, and the processor 112.

(1) Camera

The camera 101 includes an imaging element, such as a Charge Coupled Device (CCD) or a Complementary Metal Oxide Semiconductor (CMOS), and captures an image. The image (each of frames constituting a moving image) captured by the camera 101 is handled as an input image for a process performed by the information processing apparatus 100.

(2) Microphone

The microphone 102 collects speech uttered by the user and generates speech signal. The speech signal generated by the microphone 102 is handled as an input speech for speech recognition performed by the information processing apparatus 100.

(3) Input Device

The input device 103 is a device that is used by the user to directly operate the information processing apparatus 100. The input device 103 may include, for example, a button, a switch, a dial, and the like that are arranged on a housing of the information processing apparatus 100. The input device 103, upon detecting input from the user, generates an input signal corresponding to the detected input from the user.

(4) Communication Interface

The communication I/F 104 relays communication between the information processing apparatus 100 and other apparatuses (external apparatuses). The communication I/F 104 supports an arbitrary wireless communication protocol or wired communication protocol, and establishes a communication connection with the other apparatuses.

The communication I/F 104 may be, for example, a connection port of a Universal Serial Bus (USB) terminal, an optical audio terminal, a High-Definition Multimedia Interface (HDMI) (registered trademark) terminal, or the like.

Furthermore, the communication I/F 104 may be configured with a communication device or the like for connecting to a network. For example, the communication I/F 104 may be a communication card for a wired or wireless Local Area Network (LAN), Bluetooth (registered trademark), Wi-Fi (registered trademark), or a Wireless USB (WUSB), or the like. Moreover, the communication I/F 104 may be a router for optical communication, a router for Asymmetric Digital Subscriber Line (ADSL), or a modem for various kinds of communication. The communication I/F 104 transmits and receives a signal or the like to and from, for example, the Internet or other communication apparatuses by using a predetermined protocol, such as TCP/IP. Furthermore, the network connected to the communication I/F 104 may be a network that is connected in a wired or wireless manner, and may be, for example, the Internet, a home LAN, or the like.

Moreover, the communication I/F 104 may receive a content signal from an external apparatus (for example, an Internet distribution server), extract content data from the content signal, and generate a content image based on the content data.

(5) Memory

The memory 105 is configured with a semiconductor memory or a storage medium, such as a hard disk, and stores therein a program and data used for a process performed by the information processing apparatus 100 and the content data. The data stored in the memory 105 may include, for example, feature data that is used for image recognition and speech recognition, which will be described later. Meanwhile, a part or all of the program and the data described in this specification may be acquired from an external data source (for example, a data server, a network storage, an external memory, or the like), instead of being stored in the memory 105.

(6) Tuner

The tuner 106 extracts a content signal of a desired channel from a broadcast signal that is received via an antenna (not illustrated), and demodulates the content signal. Further, the tuner 106 outputs the demodulated content signal to the decoder 107.

(7) Decoder

The decoder 107 decodes content data from the content signal input from the tuner 106. The decoder 107 may decode content data from a content signal that is received via the communication I/F 104. A content image may be generated based on the content data decoded by the decoder 107.

(8) Display

The display 108 includes a screen made with a Liquid Crystal Display (LCD), an Organic Light-Emitting Diode (OLED), a Cathode Ray Tube (CRT), or the like, and displays an image generated by the information processing apparatus 100. For example, the content image and UI images (the item images 30 or the like), which are explained above with reference to FIG. 1, may be displayed on the screen of the display 108.

(9) Utterer

The utterer 109 includes a circuit element, such as a diaphragm and an amplifier, and outputs speech based on an output speech signal that is generated by the information processing apparatus 100. A volume of the utterer 109 is changeable.

(10) Remote Control Interface

The remote control I/F 110 is an interface that receives a remote control signal (an infrared signal or other radio signals) that is transmitted from a remote controller used by the user. The remote control I/F 110, upon detecting the remote control signal, generates an input signal corresponding to the detected remote control signal.

(11) Bus

The bus 111 connects the camera 101, the microphone 102, the input device 103, the communication I/F 104, the memory 105, the tuner 106, the decoder 107, the display 108, the utterer 109, the remote control I/F 110, and the processor 112 to one another.

(12) Processor

The processor 112 may be, for example, a Central Processing Unit (CPU), a Digital Signal Processor (DSP), or the like. The processor 112 executes a program that is stored in the memory 105 or a different storage medium, and implements various functions of the information processing apparatus 100 to be described later.

Thus, the hardware configuration of the information processing apparatus 100 according to the present embodiment has been described above. Meanwhile, the hardware configuration illustrated in FIG. 2 is one example, and the present disclosure is not limited to this example. For example, the information processing apparatus 100 need not always include the camera 101, and an external apparatus, such as a smartphone, may be used instead of the remote controller.

2-2. Functional Configuration Example

Figure 3:
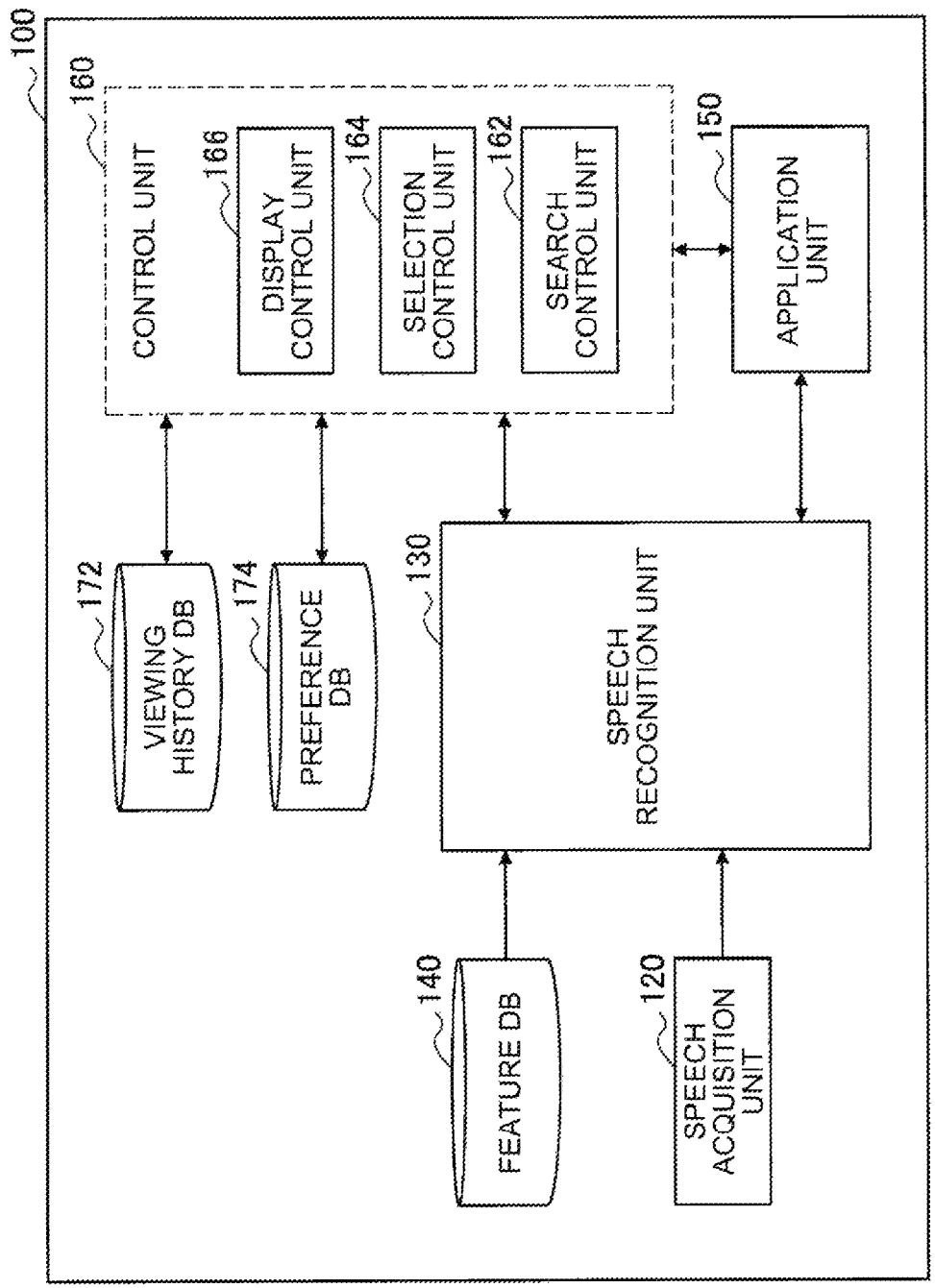
FIG. 3 is a block diagram illustrating an example of a configuration of logical functions implemented by a memory and a processor of the information processing apparatus illustrated in FIG. 2.

FIG. 3 is a block diagram illustrating an example of a configuration of logical functions implemented by the memory 105 and the processor 112 of the information processing apparatus 100 illustrated in FIG. 2. With reference to FIG. 3, the information processing apparatus 100 includes a speech acquisition unit 120, a speech recognition unit 130, an application unit 150, a feature database (DB) 140, and a control unit 160. The control unit 160 includes a search control unit 162, a selection control unit 164, and a display control unit 166. Meanwhile, a part of the functional blocks illustrated in FIG. 3 may be implemented by an apparatus outside the information processing apparatus 100 (for example, in a cloud computing environment). For example, the control unit 160 may cause an external control function to perform a control process as described below, instead of performing the process by itself. Similarly, the speech recognition unit 130 may cause an external speech recognition function to perform a speech recognition process as described below, instead of performing the process by itself.

(1) Speech Acquisition Unit

The speech acquisition unit 120 acquires, as an input speech, speech signal that is generated by the microphone 102. Further, the speech acquisition unit 120 outputs the acquired input speech to the speech recognition unit 130.

(2) Speech Recognition Unit

The speech recognition unit 130 recognizes speech of a user on the basis of an input speech that is input from the speech acquisition unit 120. The speech recognition unit 130 converts the input speech to a text indicating a content of the input speech, and outputs the text to the control unit 160 or the application unit 150.

Furthermore, the speech recognition unit 130 may recognize an utterer (user) by using speech feature data that is stored in the feature DB 140, when recognizing the input speech that is input from the speech acquisition unit 120. The speech recognition unit 130 outputs an identification result of the utterer to the control unit 160 and the application unit 150.

(3) Feature Database

The feature DB 140 stores therein, in advance, speech feature data that is used for speech recognition by the speech recognition unit 130. The speech feature data may include, for example, speech feature amount that indicates a feature of an utterance for each of users.

Further, the feature DB 140 mays tore therein image feature data that is used for image recognition by the application unit 150. The image feature data may include, for example, a known image feature amount of a predetermined portion, such as a hand or a face, of the user. Furthermore, the image feature data may include face image data for each of the users. Moreover, the feature DB may be obtained by, for example, referring to or acquiring a database on an external apparatus, such as an external server, or may include feature data of other persons.

(4) Application Unit

The application unit 150 executes various application functions included in the information processing apparatus 100. For example, the application unit 150 may execute a program replay function, an Electronic Program Guide (EPG) display function, a video recording setting function, an external input switching function, a photograph reproduction function, a video replay function, a music replay function, an Internet browsing function, and the like. The application unit 150 outputs an application image and speech (may include a content image) that are generated through the application function to the control unit 160.

At least a part of the application function executed by the application unit 150 cooperates with the speech recognition unit 130 and receives speech input from the user. For example, the program replay function may change setting of a channel, a volume, or the like of a television program or an Internet-distributed program or replay a recorded program, in accordance with speech content that is recognized by the speech recognition unit 130. The electronic program guide display function may change a channel and a time period of the electronic program guide to be displayed, in accordance with the speech content that is recognized by the speech recognition unit 130. The video recording setting function may set a recording date and time and a channel, in accordance with the speech content that is recognized by the speech recognition unit 130. Data of a recorded program may be stored in the memory 105 of the information processing apparatus 100.

The external input switching function may change external input, in accordance with the speech content that is recognized by the speech recognition unit 130. The photograph reproduction function may reproduce a photograph that is captured on a specific date that is recognized by the speech recognition unit 130. The Internet browsing function may perform an Internet search using a keyword that is recognized by the speech recognition unit 130.

Furthermore, an image captured by the camera 101 may be input to the application unit 150. The application unit 150 may recognize an input image. In image recognition, for example, an image feature amount extracted from the input image is checked against an image feature amount that is stored in advance in the feature DB 140 with respect to a predetermined portion of a body of the user, and the predetermined portion is recognized. The predetermined portion may include, for example, at least one of a hand and a face of the user. Accordingly, for example, the application unit 150 identifies the user by face recognition. Furthermore, the application unit 150 may recognize a predetermined gesture from movement of a hand. In other words, at least a part of the application function executed by the application unit 150 receives a gesture input from the user.

(5) Search Control Unit

The search control unit 162 controls a process in which at least a part of the application function executed by the application unit 150 receives speech input from the user in cooperation with the speech recognition unit 130 and searches for a content desired by the user. For example, in the program replay function, when speech input is received from the user and a program is to be displayed, the search control unit 162 searches for a cannel (a channel number or a channel name) corresponding to a name that includes (partially matches) at least a phrase (search word) that is recognized by the speech recognition unit 130, a name of a program that is currently broadcasted or distributed via the Internet, a recorded program, an application, or the like. The recorded program may be stored in the memory 105 or may be stored in an external apparatus, such as a recorder, that is connected via the communication I/F 104.

Furthermore, in the external input switching function, when speech input is received from the user and external input is to be changed, the search control unit 162 searches for an external input apparatus corresponding to a name that includes (partially matches) at least a phrase (search word) that is recognized by the speech recognition unit 130.

(6) Selection Control Unit

The selection control unit 164 performs control of selecting a single content to be executed from among search results obtained by the search control unit 162. If a single search result is obtained, it is sufficient for the selection control unit 164 to select the search result, but if a plurality of search results are obtained, the selection control unit 164 selects a single content in accordance with a predetermined criterion in order to select a content that is highly likely to be requested by the user.

The predetermined criterion is, for example, priority that is calculated based on a person (specifically, a viewing user), a time (specifically, a viewing time), or the like. The selection control unit 164 is able to refer to, for example, at least one of viewing history information acquired from a viewing history DB 172 and preference information on the user acquired from a preference DB 174, and calculate priority of each of retrieved contents in accordance with at least one of the viewing user and a current time. The viewing user may be identified by speech recognition, image recognition (face recognition), or reference to user information.

More specifically, for example, the selection control unit 164 may increase priority of a channel, a program, or a genre that is frequently viewed by the viewing user (for example, a channel, a program, or a genre that is highly frequently viewed in the latest predetermined period) or increase priority of a program, a genre, or the like that is frequently recorded by the viewing user, on the basis of the viewing history or the preference information of the viewing user that is identified by speech recognition or the like. The genre is a classification that depends on details of the content, and may be, for example, news, music, drama, movie, variety show, or the like.

Furthermore, for example, the selection control unit 164 increases priority of a channel, a program, or a genre that is frequently viewed by the viewing user at the current time, or a program, a genre, or the like that is frequently recorded.

Moreover, for example, the selection control unit 164 may acquire, from the preference information, information on an entertainer, a singer, a character, or the like that the viewing user prefers, and increase priority of a content in which the entertainer, the singer, the character, or the like appears among the search results.

Furthermore, the selection control unit 164 may calculate priority in accordance with a combination of viewing users or the number of viewing users. For example, it may be possible to identify a channel, a program, or a genre that is frequently viewed by only parents, a channel, a program, or a genre that is frequently viewed by only children, or a channel, a program, or a genre that is frequently viewed by all of family members on the basis of the viewing history, and appropriately calculate priority.

Moreover, even if it is difficult to acquire identification information on the viewing user, the selection control unit 164 may increase priority of a channel, a program or a genre that is frequently viewed at a current time period, a program or a genre that is frequently recorded, or the like. Furthermore, it may be possible to determine priority by combining viewing history information or the preference information on the viewing user and viewing history information or preference information on a different person, or it may be possible to determine priority from only the viewing history information or the preference information on the different person. Specifically, for example, with respect to those that are determined, among search results, as meeting a predetermined criterion on the basis of viewing history information on users all over Japan, it may be possible to determine priority on the basis of the viewing history information or the preference information on the viewing user.

Moreover, the selection control unit 164 may increase priority of a channel, a program, or a genre that is recently selected, on the basis of only the viewing history irrespective of a person and a time, for example.

Furthermore, if the search results include recorded programs, the selection control unit 164 may increase priority of a program that is not yet viewed as compared to priority of a program that is already viewed.

(7) Viewing History Database

The viewing history DB 172 stores therein a viewing history of a content (a broadcast program, a recorded program, an Internet-distributed program, an application, or the like). The viewing history may include a viewing time of a content, the number of times of use of an application, information on a viewing user, a search history of the user, a selection history with respect to a search result, and the like. Furthermore, the viewing history DB 172 may store therein timer recording information. Moreover, the viewing history DB 172 may be constructed inside the information processing apparatus 100, or may be constructed on an external apparatus, such as an external server, and referred to or acquired. Furthermore, the viewing history DB 172 may include information other than information on the user of the information processing apparatus 100.

(8) Preference Database

The preference DB 174 stores therein preference information on the user. The preference information may be acquired from an answer that is obtained in response to a questionnaire or the like that is sent to the user in advance, or may be acquired from the viewing history, a program search history, the timer recording information, or the like on the user. For example, the information processing apparatus 100 or the external apparatus may determine the preference information on the user through speech recognition or image recognition using a camera. Furthermore, the preference information DB 174 may be constructed inside the information processing apparatus 100 or may be constructed on an external apparatus, such as an external server, and referred to or acquired. Moreover, the preference information DB 174 may include information other than information on the user of the information processing apparatus 100.

(9) Display Control Unit

The display control unit 166 controls display of an image via the display 108. For example, the display control unit 166 causes the display 108 to display an application image that is input from the application unit 150. Furthermore, when the search control unit 162 controls a search and the selection control unit 164 controls a selection, the display control unit 166 generates an output image corresponding to a search result and a selection result, and causes the display 108 to display the output image.

Specifically, for example, when the application unit 150 activates a program replay application and when the search control unit 162 controls a search for a content and the selection control unit 164 controls a selection of a content to be replayed (executed) from among search results in accordance with speech input from the user, the display control unit 166 causes the display 108 to display the selected content (in other words, execute the selected content). Furthermore, the display control unit 166 generates item images representing the search results (may display names of contents as reading items), and causes the display 108 to display the item images. The item images may automatically be deleted if the user does not perform input for a predetermined time, or a display duration may be determined on the basis of user setting, information in the preference information DB, or the like. It may be possible to display, in a highlighted manner, an item image indicting a name of the content that is automatically selected from among the search results, or it may be possible not to display the content selected by the selection control unit 164 in the item images. Furthermore, the display control unit 166 may additionally display an image for requesting input when the content is changed.

(10) Control Unit

The control unit 160 may control each of the search control unit 162, the selection control unit 164, and the display control unit 166 as described above, and also control the entire information processing apparatus 100. For example, in the standby state in which at least speech detection by the microphone 102 and speech recognition by the speech recognition unit 130 are activated, the control unit 160 according to the present embodiment performs control of continuing to receive speech input from the user. If a content of the speech input from the user relates to the program replay function (for example, if the content of the speech input is "oo (a predetermined call for a system name or the like), "show NNN (channel name)"", or the like), the control unit 160 turns on the power supply of the entire information processing apparatus 100 including the display 108. Then, the control unit 160 causes the application unit 150 to activate the program replay application and causes the display 108 to display an image of a content that is selected by the selection control unit 164 from among one or more contents that are retrieved by the search control unit 162 on the basis of the speech input. At this time, as described above, the control unit 160 may display the item images indicating the names of the respective retrieved contents and the image for requesting input at the time of switching to a different content, in an overlapped manner on the image of the content.

In this manner, even in a state in which the power supply of the information processing apparatus 100 is turned off, the information processing apparatus 100 is able to receive speech input from the user, and when speech input for requesting replay of a content is detected, the information processing apparatus 100 is able to turn on the power supply and display the content requested by the user.

Meanwhile, the speech input may be received by, as described above, an audio device (for example, a smart speaker or the like) that is connected to the information processing apparatus 100. The audio device may transmit the detected speech of the user to a speech recognition server on a cloud. Therefore, in this case, the power supply of the information processing apparatus 100 is automatically turned on by a control signal that is transmitted from the audio device or the server on the cloud, and the content requested by the user is displayed on the basis of a speech recognition result.

Thus, the functional configuration of the information processing apparatus 100 according to the present embodiment has been described above. Meanwhile, the functional configuration of the information processing apparatus 100 illustrated in FIG. 3 is one example, and embodiments are not limited to this example. For example, at least a part of the functional configuration of the information processing apparatus 100 illustrated in FIG. 3 may be arranged in an external apparatus (a local terminal or a server on a cloud) that is communicably connected to the information processing apparatus 100. Furthermore, the information processing apparatus 100 may be configured such that, in the standby state, the power supply is automatically turned on by an operation on any of buttons arranged on a remote controller or the like, or may be configured without a function that automatically turns on the power supply on the basis of speech recognition.

3. EXAMPLES

Some examples of speech input that may be performed in the information processing apparatus 100 according to the present embodiment will be described in detail below with reference to FIG. 4 to FIG. 13.

3-1. First Example: Speech Input of "Channel Name"

First, as a first example, a case will be described in which speech input of a channel name is performed as one example of speech input for requesting replay of a content by a user.

Figure 4:
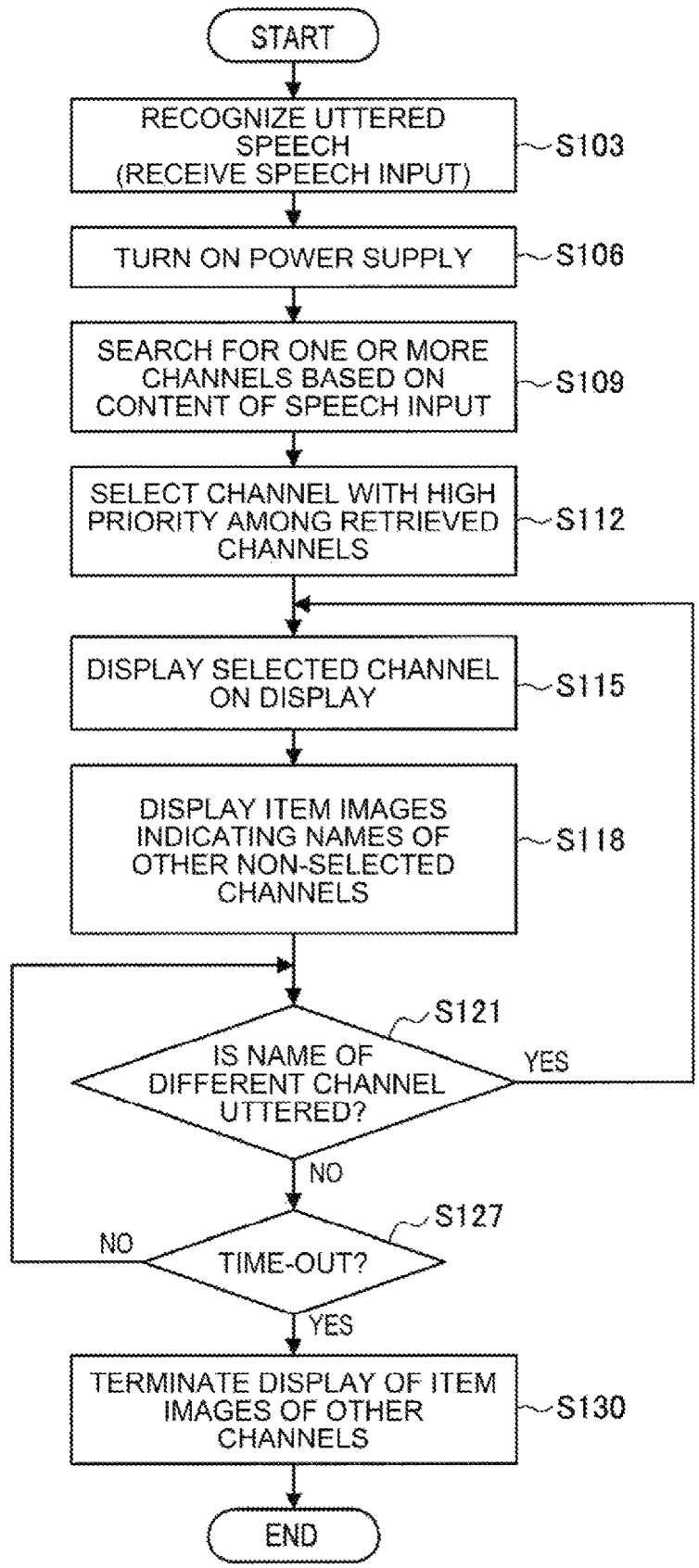
FIG. 4 is a flowchart illustrating an example of the flow of an operation process of the information processing apparatus in a case where speech of a channel name is input according to a first example of the present embodiment.

FIG. 4 is a flowchart illustrating an example of the flow of an operation process performed by the information processing apparatus 100 in a case where speech input of a channel name is performed according to the first example.

As illustrated in FIG. 4, first, if the microphone 102 in the information processing apparatus 100 detects an uttered speech of a user (for example, "oo (a predetermined call for a system name or the like), "show NNN (channel name)"" or the like), the speech recognition unit 130 performs speech recognition (Step S103). In this example, it is assumed that a power supply state of the information processing apparatus 100 is set to the standby state in which the display 108 is turned off but speech input is receivable.

Subsequently, the control unit 160 in the information processing apparatus 100 turns on the power supply of the information processing apparatus 100 (Step S106). Accordingly, the display 108 is turned on. Meanwhile, if the power supply of the information processing apparatus 100 is already turned on and the display 108 is turned on, the process at Step S106 is skipped.

Then, the search control unit 162 searches for a channel corresponding to the channel name that is given by the speech input, on the basis of a speech recognition result (Step S109).

Subsequently, if a plurality of channels are retrieved by the search control unit 162, the selection control unit 164 selects one of the channels on the basis of priority (Step S112). For example, the selection control unit 164 may increase priority of a certain channel that is frequently viewed at a current time period on the basis of the current time and the viewing history and select the certain channel. Alternatively, the selection control unit 164 may identify an utterer (in other words, a viewing user) through the speech recognition, and calculate priority of each of the retrieved channels on the basis of the viewing history or the preference information on the viewing user. Still alternatively, it may be possible to calculate priority on the basis of a past selection history of the user or selection data of a different user who uses the same function. In this manner, by selecting a content in accordance with the priority based on a person or a time, it is possible to automatically select a content that is highly likely to be requested by the user. Furthermore, the priority may be determined by taking into account setting that is made for a channel or a content by the user. Specifically, for example, it may be possible to perform a process of allowing the user to specify priority of a channel or a content, or increasing priority of a program that is included in a scheduled viewing list, a content that is bookmarked, or a program for which timer recording is set.

Then, the display control unit 166 causes the display 108 to display a video (select a channel) of a currently broadcasted program on the channel that is selected by the selection control unit 164 (Step S115).

Subsequently, the display control unit 166 generates item images representing search results and causes the display 108 to display the item images (Step S118). At Step S118, it may be possible to generate an image for requesting speech input or operation on a remote controller for switching the channel, and causes the display 108 to display the image. Here, FIG. 5 illustrates an example of display of UI images at the time the speech input is performed according to the present example.

Figure 5:
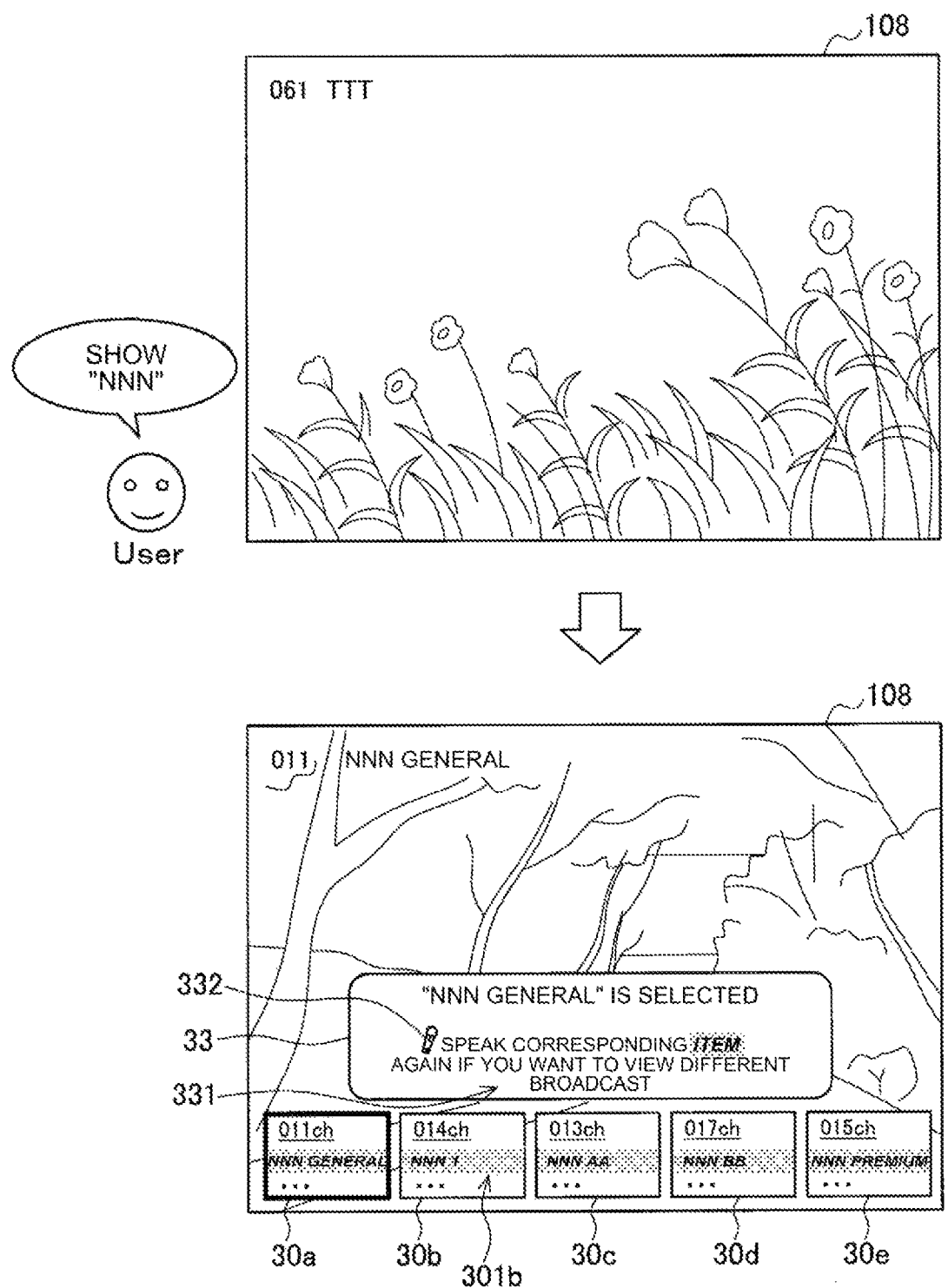
FIG. 5 is a diagram illustrating an example of display of UI images for the time when speech is input according to the first example of the present embodiment.

As illustrated in an upper part in FIG. 5, for example, when a certain content is viewed (here, it is assumed that the power supply of the information processing apparatus 100 is turned on), and if the user utters that "oo (a predetermined call for an agent name or the like), "show NNN (channel name)"", the search control unit 162 searches for a channel corresponding to "NNN". There may be a case in which a plurality of channels with names including the phrase of "NNN", such as "NNN General", "NNN 1", "NNN AA", and "NNN premium", are present (terrestrial broadcast, satellite broadcast, cable television (cable broadcast), an Internet-distributed content, and the like may be included). In this case, the selection control unit 164 selects a channel that is most likely to be requested by the user from among the plurality of channels (options for selection), in accordance with priority based on the viewing history or the like of the user. Furthermore, an utterance of the user may start to be received by operating a button arranged on the remote controller without the predetermined call, or may start to be received by operation on a mobile terminal, such as a smartphone. Moreover, speech may be received by the remote controller side, the smartphone side, or the information processing apparatus 100 side.

Furthermore, as illustrated in a lower part in FIG. 5, the display control unit 166 causes the display 108 to change a display screen to the selected channel. Moreover, the display control unit 166 displays the item images 30 (30a to 30e) representing the search results on the changed screen for a predetermined period, for example. With this configuration, if the automatically selected channel does not fit the request of the user, it is possible to support speech input when the user changes a channel again. Here, the item images 30 may continuously be displayed until the user gives a certain instruction, or a display time may dynamically be changed on the basis of a state of the user instead of being constant.

Specifically, as illustrated in a lower part in FIG. 5, the display control unit 166 causes the display 108 to display the item images 30 (30a to 30e) representing a plurality of channels as the search results and an image 33 for requesting speech input when the channel is to be changed. The display control unit 166 may display the item images 30a to 30e in an aligned manner from left or top in order of priority, and may display the item images 30a to 30e randomly on the entire screen of the display 108. Furthermore, it may be possible to display an image for requesting input by a button of a remote controller or a smartphone, a touch panel, or a gesture of the user, instead of the image 33 for requesting speech input, or it may be possible to display nothing. On the item images 30, it may be possible to display, as the reading items, names of the channels in a predetermined display mode, or alternatively, it may be possible to display information related to the channels or broadcast programs, such as title information on the programs that are currently broadcasted on the channels, channel numbers, channel marks, or electronic program guides (EPGs). Furthermore, it may be possible to display, on the item images 30, broadcast states that indicate how long the currently broadcasted programs have been broadcasted in total broadcast times of the respective programs. Moreover, the display control unit 166 may clearly indicate a current selection by displaying, in a highlighted manner, the item image 30a representing the currently selected channel among the item images such that the item image is distinguished from the other item images, or by displaying an icon of "selected" or the like.

The "reading item" is a phrase that is recommended to be read, and with use of this, it possible to prevent reading that may be hard to recognize or unclear reading. In the present example, the names of the channels on the item images 30 are used as the reading items, but the reading items may be any character information (including character information that is displayed as image data) displayed on the item images 30. On the item images 30, display modes of the reading items may be distinguished from other texts or illustrations of utterers, mouths, or persons who are speaking may be added to make it possible to allow the user to easily recognize the reading items. Furthermore, as illustrated in FIG. 5, it is possible to further allow the user to easily recognize the reading items by matching the display modes of reading items 301 and a display mode of an indicator portion 331 in a text for explaining the reading item on the image 33 that requests speech input (for example, the same character color, the same background color, the same font, or the like is used).

Alternatively, on the image 33 for requesting speech input, a descriptive text, such as "please read an item with a color of oo (a display color of the reading item)". Furthermore, even on the image 33 for requesting speech input, it may be possible to display an image 332, such as an illustration of a microphone, an illustration of a mouth, an illustration of a person who is speaking, to more intuitively request speech input.

Subsequently, if a name of a different channel is uttered (Yes at Step S121), the selection control unit 164 in the information processing apparatus 100 selects the channel with the uttered name, and the display control unit 166 causes the display 108 to display a video of the selected channel (Step S115). Even in this case, it may be possible to display the item images representing the search results again (Step S118).

The UI images for supporting speech input, such as the item images and the image for requesting speech input as described above, may be displayed for a predetermined time (for example, several seconds). In this case, for example, if a time-out occurs after a lapse of the predetermined time since the change of the channel (Yes at Step S127), the display control unit 166 terminates display of the item images (Step S130). Meanwhile, if the image for requesting speech input or operation on a remote controller for switching the channel is also displayed, the display control unit 166 also terminates displays of the image for requesting the speech input or the operation on the controller at Step S130. Furthermore, a display time of the above-described images may be determined on the basis of setting made by the user, user information, or the like, or may dynamically be set on the basis of past selection information on the user, a current behavior, or the like.

Meanwhile, a final channel selection result is stored, as the viewing history, in the viewing history DB 172 together with the time information or the identification information on the user, and used by the selection control unit 164 for calculating priority at a next channel selection. By repeating the above-described process, it is possible to more reliably select a content that is highly likely to be requested by the user. Furthermore, the information stored in the viewing history DB 172 may be used to determine, for example, the display time of the item images or the display content of the image for requesting input, and information related to a process for determining the display time or the display content may also be stored in the viewing history DB 172.

3-2. Second Example: Simultaneous Display of Currently Broadcasted Program and Recorded Program In the first example as described above, a channel is selected in accordance with speech input of a channel name, and the display 108 is caused to display a currently broadcasted program on the channel; however, the present disclosure is not limited to this example, and the information processing apparatus 100 may select a recorded program on the selected channel. In other words, a selection target may include recorded programs in addition to currently broadcasted programs on the retrieved channels, and it may be possible to simultaneously display the currently broadcasted programs and the recorded programs on the item images representing the search results. Furthermore, it may be possible to search for a currently broadcasted program and a recorded program in accordance with speech input of a program name, instead of speech input of a channel name, and adopt the retrieved programs as display targets for a selection target and the item images representing the search results. A case in which the currently broadcasted program and the recorded program are simultaneously displayed will be described in detail below.

An operation process of the present example is the same as the operation process of the first example as described above mainly with reference to FIG. 4. The present example is different in that, at Step S109 as described above, a recorded program is included in search targets in addition to a currently broadcasted program. For example, if the user performs speech input of a name of a certain channel, the search control unit 162 outputs search results including a recorded program on a retrieved channel. Here, the search targets, the search results, and the item images may include only recorded programs, without including currently broadcasted programs.

Figure 6:
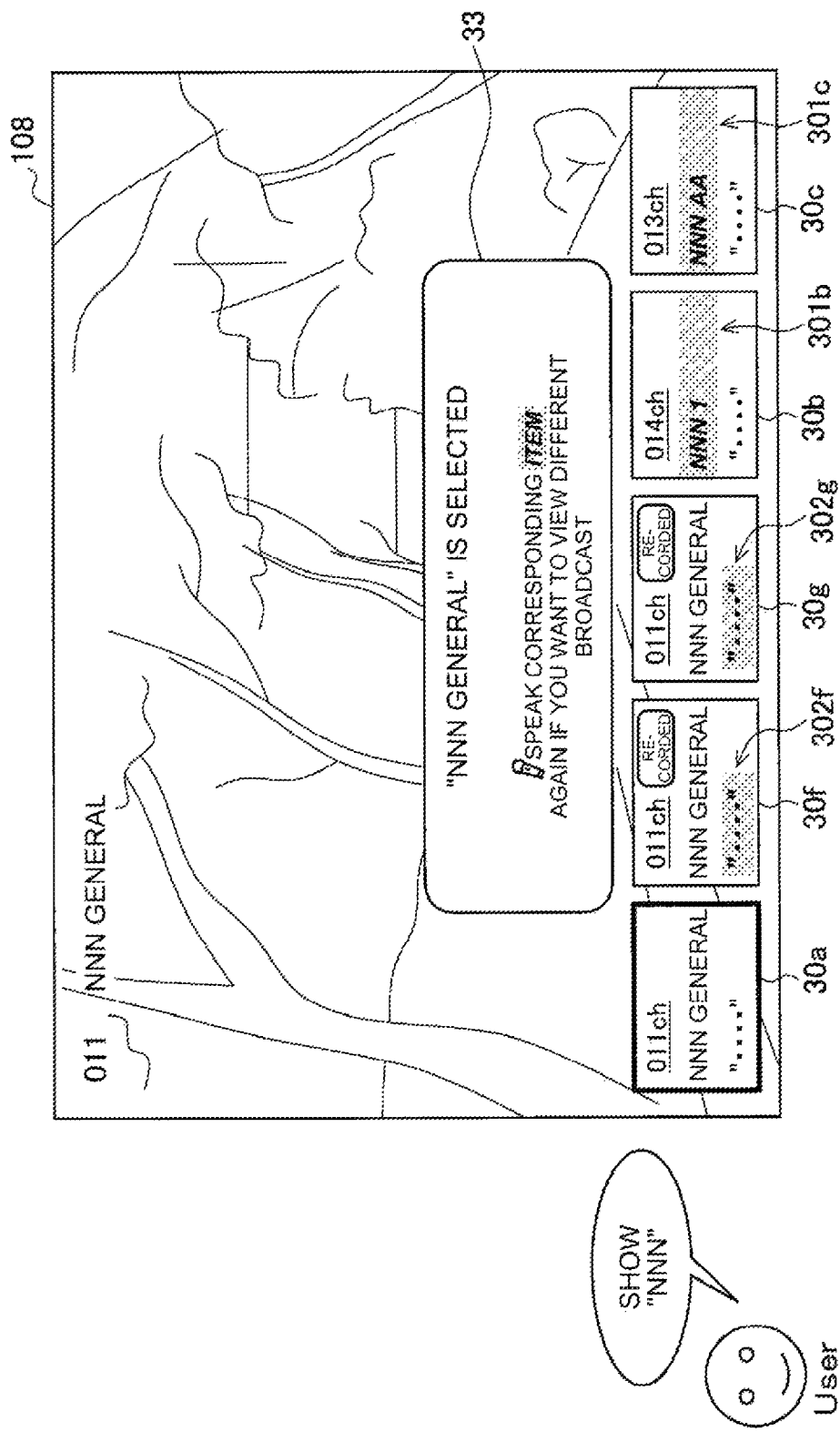
FIG. 6 is a diagram for explaining a case in which both of a currently broadcasted program and a recorded program are simultaneously displayed as search results according to a second example of the present embodiment.

FIG. 6 is a diagram for explaining a case in which the currently broadcasted program and the recorded program are simultaneously displayed as the search results according to the present example. As illustrated in FIG. 6, for example, if the user performs speech input of "show "NNN (channel name)"", the search control unit 162 searches for one or more channels with names that at least partially include "NNN", and further searches for a recorded program on each of the retrieved channels. The recorded program may be stored in the memory 105, or may be stored in an external apparatus (for example, a recorder) that is connected to the information processing apparatus 100. Furthermore, the recorded program to be retrieved may be limited to a program that is not yet viewed, or it may be possible to increase priority (to be described below) of a program that is not yet viewed among recorded programs or decrease priority of a program that is already viewed.

The selection control unit 164 selects a content for which predetermined priority (for example, priority based on the viewing history or the preference information on the user, a time, or the like) is the highest among the search results. For example, if the user performs speech inputs while viewing the currently broadcasted program, the selection control unit 164 selects a currently broadcasted program on a channel that is frequently viewed by the user and changes display on the display 108.

Furthermore, as illustrated in FIG. 6, the display control unit 166 displays the item images 30 (30a, 30f, 30g, 30b, and 30c) representing the search results in order of priority, for example. The search results include recorded programs; therefore, to clearly indicating that a program is a recorded program rather than a currently broadcasted program on the same channel, the display control unit 166 may display "recorded marks" (see item images 30f and 30g in FIG. 6) on the target item images 30, or may change the display modes of the item images representing the recorded programs.

Moreover, the reading items may be clearly indicated by changing the display mode or adding illustration images of utterers or the like, similarly to the first example. Here, if channel names are redundant among the item images 30, it is difficult to distinguish between the channel names only by reading the channel names; therefore, it may be possible to request speech input, as the reading items, of reading program titles or identification numbers (not illustrated) that are assigned to the item images 30. For example, in the example illustrated in FIG. 6, display modes of program titles 302 are changed to clearly indicate the reading items on the item images 30f and 30g that have redundant channel names.

3-3. Third Example: Speech Input of "Current Program"

Furthermore, even if speech input for designating an entire content or a partial content that is currently receivable is performed, the information processing apparatus 100 is able to automatically select and display a channel on the basis of priority based on a person or time.

An operation process according to the present example is the same as the operation process of the first example as described above mainly with reference to FIG. 4. For example, if speech input of a "current program" for designating an entire content or a partial content that is currently receivable is performed instead of a name of a channel, the search control unit 162 searches for, at Step S109 as described above, a currently receivable content (terrestrial broadcast, satellite broadcast, cable television (cable broadcast), an Internet-distributed content, or the like), and the selection control unit 164 selects, at Step S112 as described above, a channel (program) in accordance with priority of a channel (or a program) that is calculated based on, for example, a viewing history or preference information on a recognized viewing user, user information, user setting, information on a different user, and the like.

Figure 7:
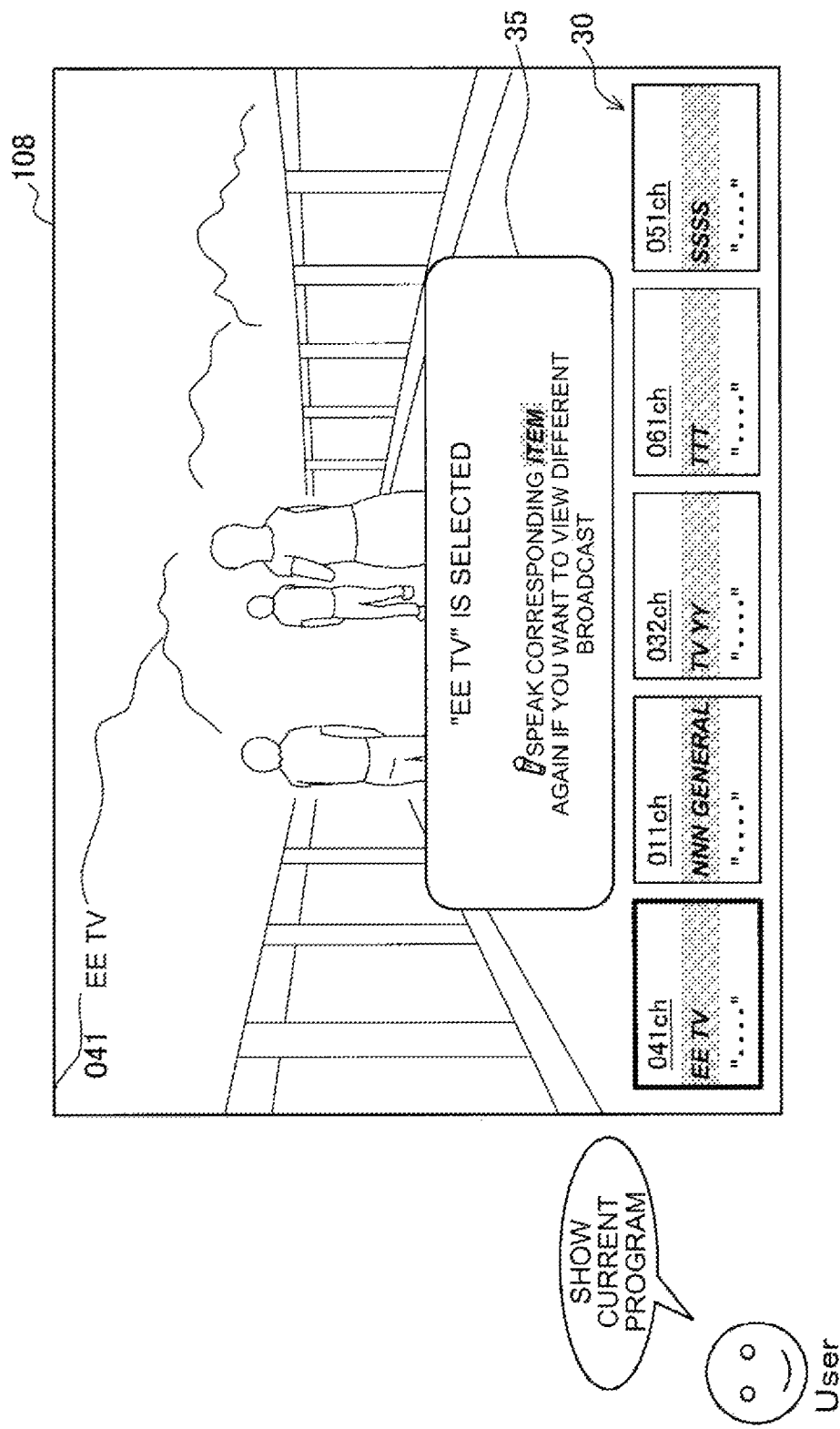
FIG. 7 is a diagram for explaining a display example in a case where speech related to a current program is input according to a third example of the present embodiment.

FIG. 7 is a diagram for explaining a display example in a case where speech input related to a current program is performed according to the present example. As illustrated in FIG. 7, for example, the information processing apparatus 100 automatically changes the display screen of the display 108 to a selected channel in accordance with priority (if the power supply is turned off, display may be performed after the power supply is automatically turned on) in response to speech input of "show a current program" from the viewing user, and displays the item images 30 representing other options in order of priority. Furthermore, the information processing apparatus 100 may additionally display an image 35 for requesting input when a different channel is to be selected.

Meanwhile, for example, the speech input, such as a "current program", which designates an entire content or a partial content that is currently receivable is not limited to a broadcast program, but may be an Internet-distributed content. Furthermore, in other examples described in this specification, search targets of the search control unit 162 may include an Internet-distributed content. Moreover, the speech input may be "terrestrial" or "satellite broadcast" (more specifically, for example, speech input of a "currently broadcasted terrestrial program" or "include programs of satellite broadcast"), which designates a transmission means, and in this case, a program that is currently receivable through the corresponding transmission means is retrieved.

3-4. Fourth Example: Speech Input of "Genre"

Furthermore, even if speech input of a genre of a program (one example of the content) is performed, the information processing apparatus 100 is able to automatically select and display a program that is highly likely to be requested by the user, in accordance with priority based on a person or time.

Examples of the genre of the program include a movie, a drama, a variety show, music, news, and a documentary. The information processing apparatus 100 may search for a program corresponding to a genre that is given by the speech input by the user, and, similarly to each of the examples as described above, replay a program that is selected based on priority corresponding to the viewing history, the preference information, or the like on the user (if the power supply is turned off, display may be performed after the power supply is automatically turned on), and display the item images representing the search results in an aligned manner in order of priority. The user may set a preferable genre in advance so that it is possible to search for a more specific genre or a content, such as a documentary related to music, with a plurality of genre attributes. Furthermore, similarly to each of the examples as described above, the information processing apparatus 100 may additionally display an image for requesting input when a different program is to be selected. Moreover, while the genre of a program is particularly described as an example, the genre of the content is not limited to this example, but may be, for example, a video, music, an image, or an application, or may be a content genre, such as jazz, rock, or ballad, other than a video content.

The search targets are not limited to current broadcast programs, but a wide variety of currently viewable contents, such as recorded programs (may be limited to a program that is not yet viewed, or priority of an already viewed recorded program may be reduced), Internet-distributed programs, video on demand (VOD) items, live streaming videos, and the like may be adopted.

On each of the item images that are displayed as options for selection and that represent search results, display indicating whether the contents are recorded programs, Internet-distributed programs, or the like, or display indicating channel numbers, channel names, program titles, or the like may be provided.

3-5. Fifth Example: Speech Input for Asking for a Recommended Content or The Like Furthermore, even if abstract speech input for asking for a recommended content is performed, the information processing apparatus 100 is able to automatically select and display a program in accordance with priority based on a person or time. The search targets include a wide variety of currently viewable contents, such as currently broadcasted programs, recorded programs, and Internet-distributed contents.

Specifically, for example, if the user performs speech input of "show recommendations", similarly to each of the examples as described above, the information processing apparatus 100 searches for recommended contents (for example, a program in which an actor preferred by the user appears, a program of a genre preferred by the user, or the like) from among currently viewable contents on the basis of the viewing history or the preference information on the user, and replays a content that is selected in accordance with priority (for example, priority based on a person or a time, and priority of an already viewed recorded program may be reduced) (if the power supply is turned off, replay may be performed after the power supply is automatically turned on). Then, similarly to each of the examples as described above, the information processing apparatus 100 displays the item images representing the search results in order of priority (clearly indicates the reading items), and may also perform operation of additionally displaying an image for requesting input at the time of switching to a different content.

3-6. Sixth Example: Display of Sequential Contents

Furthermore, if sequential contents are retrieved, such as a drama series or a movie series, on the basis of speech input performed by the user, the information processing apparatus 100 is able to automatically select a content in accordance with a viewing state of the content.

For example, if the user performs speech input of a name of a content with a sequential number, the information processing apparatus 100 searches for a target content from among currently viewable contents (broadcast programs, recorded programs, Internet-distributed contents, and the like). Subsequently, if retrieved contents are a plurality of sequential contents (a plurality of contents with the same title are retrieved), the information processing apparatus 100 forms a list of the contents in ascending order of numbers for example, selects a content with the smallest number except for contents that are determined as being already viewed or that are determined as being almost viewed until closing credits or the like (one example of priority), and causes the display 108 to replay the selected content. By including, in execution selection targets, not only a content that is not yet viewed, but also a content that has been partially viewed, it is possible not to eliminate the content that has been partially viewed and it is possible to replay a continued part of the content or replay the content from the beginning. Furthermore, the information processing apparatus 100 may preferentially select the content that has been partially viewed. Moreover, if it is possible to identify a viewing user by speech recognition or the like, the information processing apparatus 100 is able to realize personalized replay control by referring to the viewing history of the viewing user and referring to a viewing state of the viewing user with respect to the retrieved content.

FIG. 8 is a diagram for explaining a display example in a case where speech input of a title of sequential contents, such as a drama, is performed according to the present example. As illustrated in FIG. 8, for example, if the user performs speech input of "show oo (a title of a drama)", the search control unit 162 in the information processing apparatus 100 searches for a content with the title of "oo" from among currently viewable programs.

Subsequently, the selection control unit 164 forms a list of retrieved contents in ascending order of numbers (the number of episodes, a series number, or the like) for example, and selects a content with the smallest number (in the example illustrated in FIG. 8, for example, a "drama episode 10") except for programs that are determined as being already viewed or that are determined as being almost viewed until closing credits or the like. Then, the display control unit 166 causes the display 108 to automatically replay (in other words, execute) the selected program (if display on the display 108 is turned off, display may be performed after the display is automatically turned on). Furthermore, for example, if a plurality of kinds of drama series each having a tittle including a keyword of "oo" are present, it may be possible to select a content with the highest priority and display the different kinds of the drama series as the item images. In this case, if the user specifies a different kind of a drama series, it may be possible to perform a process of selecting a content with the highest priority in the specified drama series, and displaying other episodes in the same series as the item images.

Moreover, as illustrated in FIG. 8, the display control unit 166 may perform a process of displaying, on a replay screen of the selected content, item images 40 (40a to 40e) indicating names of contents that are retrieved in accordance with the speech input from the user and an image 42 for requesting speech input when the viewing user selects a different retrieved content. With this configuration, it is possible to provide speech input UIs that meet the request of the user as much as possible.

The information processing apparatus 100 may clearly indicate the item image representing a content that is being executed among the item images 40a to 40e illustrated in FIG. 8 in a highlighted manner in which a color is changed or the like. Furthermore, the information processing apparatus 100 may additionally display, on the item images 40a to 40e, information indicating a viewing state of each of the contents, such as bars that represent previously replayed positions (already viewed positions). With this configuration, the viewing user is able to intuitively recognize the viewing state of each of the contents. Moreover, it may be possible to display an icon or the like representing a receivable command related to replay control, such as "continuous replay/replay from beginning". Furthermore, as illustrated in FIG. 8, the information processing apparatus 100 may display a "NEW" mark or the like for a content that is not yet viewed.

Moreover, it may be possible to display, on the item images 40, channel information, names of the contents (program titles or the like), overviews of the contents, information indicating whether the contents are currently broadcasted programs, recorded programs, VOD items, or Internet-distributed contents, or still-image or moving-image thumbnails. The channels, the information on the contents, and the still-image or moving image thumbnails may be acquired form a distribution source of each of the contents or may be acquired from a different source, such as a program information transmission server. Furthermore, the moving-image thumbnails of the contents displayed on the item images 40 may be acquired from a moving-image distribution server, the memory 105, or the like and replayed before the user selects the contents. In other words, for example, the moving-image thumbnails of the broadcast programs may be acquired from a VOD server, and moving images in which the broadcast programs are recorded may be replayed, as the moving-image thumbnails of the broadcast programs, inside the item images 40. As the still-image or moving-image thumbnails, beginning portions of the contents may be used, arbitrary positions in the contents may be used, or videos or the like specific to the thumbnails may be used.

Moreover, if it is possible to view all of the episodes by the VOD items, the Internet-distributed contents, or the like, it may be possible to display an icon representing a speech receivable command, such as "replay latest episode" or "replay from episode 1", in accordance with the recorded content.

Meanwhile, display of the information indicating the viewing states, such as the bars that represent replay positions, on the item images, display of the still-image or moving-image thumbnails, and display of the icon indicating the speech receivable command are not limited to the present example, and may be similarly applied to the first to the fifth examples as described above. Furthermore, display of the information (broadcast states) indicating passages of the broadcast times of the contents on the item images as described in the first example may be applied to each of the examples.

3-7. Seventh Example: Speech Input for Designating External Input (Example of Speech Input of "HDMI")

In each of the examples as described above, the cases have been explained in which contents are retrieved and selected in accordance with speech input from the user, but the present disclosure is not limited to this example, and the information processing apparatus 100 is able to search for external input in accordance with speech input from the user.

The information processing apparatus 100 is able to receive video data or voice data from an external apparatus, such as a recorder, a gaming device, a personal computer (PC), a digital camera, or a smartphone, that is connected via the communication I/F 104, and cause the display 108 or the utterer 109 to output or replay the data. It is possible to connect a plurality of external apparatuses to the information processing apparatus 100 (or the information processing apparatus 100 may be connected to the plurality of external apparatuses via a distributor). In a situation in which one or more external apparatuses are connected to the information processing apparatus 100, the user is able to select or switch the external apparatus by speech input. A search process and display of speech input UI images by the information processing apparatus 100 in this case will be described below with reference to FIG. 9 and FIG. 10.

Operation Process

FIG. 9 is a flowchart illustrating an example of the flow of an operation process in a case where speech input for designating external input is performed according to the present example. Here, an operation process in a case where the information processing apparatus 100 recognizes a predetermined call (call for an agent) by the user and a phrase for a predetermined search (in this example, for example, "external input") in the standby state in which the microphone 102 is able to perform speech detection and the display 108 is turned off.

As illustrated in FIG. 9, first, when the information processing apparatus 100 detects an uttered speech (speech input) from the user (Step S303), and if the power supply of the information processing apparatus 100 is turned off, it may be possible to perform operation of turning on the power supply (Step S306). In this case, the display 108 may remain turned off (non-display state because the display is not selected). Meanwhile, in a case where the user performs speech input by an external apparatus, such as an audio terminal, the power supply of the connected information processing apparatus 100 may be turned on when the external apparatus, such as the audio terminal, detects predetermined speech input from the user (for example, a call for the agent, an utterance of a search phrase, and the like). Furthermore, if the power supply of the information processing apparatus 100 is already turned on or if a certain content is already displayed on the display 108, the power supply state or the like is maintained as it is.

Subsequently, if the phrase obtained by speech recognition on the detected uttered speech is the "external input", the search control unit 162 of the information processing apparatus 100 searches for an external apparatus that is connected to the information processing apparatus 100 (Step S309).

Then, as illustrated in FIG. 10, the display control unit 166 of the information processing apparatus 100 forms a list of item images 45 (45a to 45e) indicating names of external apparatuses (or names of external input) that are retrieved by the search control unit 162, in accordance with priority based on the viewing history or the like of the user, and displays the list on the display 108 (Step S312). FIG. 10 is a diagram illustrating a screen example in which the search results obtained when speech input for designating external input is performed are displayed according to the present example.

As illustrated in FIG. 10, for example, the search results are displayed on the display 108 in response to speech input of "external input" from the user. The search results may be arranged in ascending order of priority or may be displayed randomly on the entire screen. The priority may be calculated by the display control unit 166 on the basis of at least a person or a time, for example. More specifically, for example, the display control unit 166 may refer to the viewing history, and calculate higher priority for an external apparatus that is frequently used at a current time or calculate higher priority for an external apparatus that is frequently used by a viewing user if the viewing user is recognized.

Here, in a case of searching for an external input device, unlike each of the examples of a content search as described above, the control unit 160 may first display the search results on the display 108 and allow the user to select external input to be selected and executed, instead of sequentially performing automatic selection and execution of external input (activation of an external apparatus or the like) from the search results. Therefore, for example, if the external apparatus is not activated, as illustrated in FIG. 10, nothing is displayed on a background screen when the item images 45 are displayed. Furthermore, if a certain content is already replayed on the display 108, it may be possible to display the item images 45 while continuously displaying the certain content.

Moreover, it is preferable that the names displayed on the item images 45 are reading names which are recommended for speech recognition, which are easily recognizable, and from which ambiguities are eliminated as much as possible. For example, it is assumed to adopt names of standards of the external input ("HDMI1/2/3") or names corresponding to device types of the external apparatuses (recorders 1/2/3, players 1/2/3, tuners 1/2/3, devices 1/2/3, or the like). The names as described above may be determined by the communication I/F 104 or the control unit 160. Furthermore, the display control unit 166 may display, as detailed information on the external apparatuses, names (product names or the like) of consumer electronics control (CEC) devices on the item images 45 together with the reading items. Moreover, on the item images 45, the display control unit 166 may clearly indicate the reading items by changing a display mode, such as highlighted display, or may display icon images representing attributes (for example, an icon representing a recorder) of the external apparatuses. Furthermore, the display control unit 166 is able to display icons representing utterers, mouth, or persons who are speaking, or the like in the vicinity of the reading items and allows the user to intuitively recognize descriptions that serve as the reading items.

Moreover, the display control unit 166 may cause the display 108 to display an image for requesting to select an external apparatus from among the displayed search results (item images) (Step S315). Specifically, for example, as illustrated in FIG. 10, an image 47 indicating an announcement of "please speak an item to be selected". Here, as illustrated in FIG. 10, for example, by setting a display mode of a character portion, such as an "item" or an "item to be selected", in the announcement to the same display mode as the reading items displayed on the item images 45 (for example, adopt the same font, the same character color, the same background color of the character, or the like), it is possible to further clearly indicate the reading items, so that it is possible to prevent reading of names that may be hard to recognize or unclear speech input.

Then, if the name of the external apparatus is uttered (Yes at Step S318), the display control unit 166 of the information processing apparatus 100 causes the display 108 to display a content input from the uttered external apparatus (Step S321). In other words, the control unit 160 performs control of switching external input to the external apparatus (external input) selected by the user. Furthermore, in this case, if a power supply of the target external apparatus is turned off, the control unit 160 performs control (activation control) of turning on the power supply of the external apparatus.

Meanwhile, even after the user has selected the external apparatus and the content input from the external apparatus has been displayed on the display 108, it may be possible to display the item images 45 representing the search results and the image 47 for requesting speech input on the display 108. With this configuration, it is possible to support switching between external apparatuses by speech input performed again.

Example of Speech Input of "HDMI"

Thus, a selection of external input by speech input from the user has been explained above. Meanwhile, even if speech input from the user is, for example, "HDMI" or a "recorder", which indicates specific designation of an external apparatus or an external input path, and a plurality of options are present (a plurality of kinds of HDMI input or recorders are present), the information processing apparatus 100 displays the item images representing the search results (the plurality of kinds of HDMI input or recorders) on the display 108, similarly to the case of the external input device as described above with reference to FIG. 10. Furthermore, it may be possible to display an image for requesting to select an external apparatus on the display 108.

Specifically, for example, if speech input for designating HDMI input is performed by the user, and a plurality of kinds of HDMI input (for example, "HDMI1", "HDMI2", "HDMI3", and "HDMI4") are retrieved as a result of a search performed by the search control unit 162, the display control unit 166 forms a list of all kinds of the HDMI input in order of priority corresponding to, for example, a person (viewing user), a time (current time), or the like, and displays item images representing the respective kinds of HDMI input (for example, item images indicating reading items of "HDMI1", "HDMI2", "HDMI3", and "HDMI4") on the display 108. To clearly indicate the reading items, it may be possible to change a display mode or additionally display icons of utterers or the like. Meanwhile, at this time, it may be possible not to select and execute HDMI (activation of an external apparatus that is connected by HDMI) and it may be possible to continuously display, as a background image, a content that has already been displayed at the time of the speech input on the display 108. Alternatively, it may be possible to select and execute HDMI on the basis of the priority and it may be possible to display a content replayed by the external apparatus or a menu screen (home screen) of the external apparatus on the display 108. If the external apparatus is not activated at the time of the speech input, it may be possible to activate the selected external apparatus, or it may be possible not to activate the selected external apparatus and it may be possible to display nothing as the background image while the item images of the search results are displayed on the display 108.

Furthermore, similarly to the example as illustrated in FIG. 10, the display control unit 166 may additionally display an image, such as "please speak an item to be selected", for requesting a selection. Here, similarly to the example as illustrated in FIG. 10, it is possible to more reliably request speech input using the reading items by matching a display mode of characters for requesting the speech input and display modes of the reading items, or by displaying an icon of a microphone in the vicinity of the characters for requesting the speech input.

Then, if the user performs speech input of "HDMI1", "HDMI2", "HDMI3", or "HDMI4" on the basis of the item images 45 (selects external input), the display control unit 166 switches to the selected external input. Specifically, the display control unit 166 causes the display 108 to display a content that is transmitted from the selected external input source. At this time, if a power supply of the external apparatus as the input destination source is turned off, the information processing apparatus 100 turns on the power supply of the target external apparatus (activation control), and acquires the content from the external apparatus. Here, the content acquired from the external apparatus may be a menu screen or the like of the external apparatus.

3-8. Eighth Example: Speech Input Related to Activation of Application or the Like Speech input in a case where an application that is installed in the information processing apparatus 100 is to be activated will be described below. For example, it is assumed that various applications (including an application prepared by a content distribution company) that are used to enjoy Internet-distributed contents are installed in the information processing apparatus 100. In this specification, in some portions below, the "application" may be abbreviated as an "app".

For example, if the user performs speech input for requesting activation of an application or a process by an application or performs speech input of a name of an application, the information processing apparatus 100 causes the search control unit 162 to search for an application that can be activated, and causes the display control unit 166 to display search results on the display 108. The speech input is not limited to the name of the specific application, but may be based on a function name, such as a "photograph application", or may simply be an "app". FIG. 11 is a diagram illustrating an example of a screen that displays search results that are obtained when speech input related to activation of an application or the like is performed according to the present example.

As illustrated in FIG. 11, for example, search results (item image 50*a* to 50*e*) that are retrieved by the search control unit 162 in response to speech input of "display of application" from the user are displayed on the display 108 under the control of the display control unit 166. The search results may be arranged in ascending order of priority, or may be displayed randomly on the entire screen. The priority may be calculated by the display control unit 166 on the basis of at least a person or a time, for example. More specifically, for example, the display control unit 166 may refer to the viewing history and calculate higher priority for an application that is frequently used at a current time or calculate higher priority for an application that is frequently used by a viewing user if the viewing user is recognized. Furthermore, it may be possible to display, on the item images 50*a* to 50*e*, icons representing commands (options) that are receivable by the applications, icons of the applications (for example, icons representing the applications on the menu screen of the information processing apparatus 100), icons representing attributes of the applications (for example, a mark of a headphone in the case of a music replay application), or the like, in addition to the names of the applications.

Here, in a case of searching for an application according to the present example, unlike each of the examples of a content search as described above, the control unit 160 may first display the search results on the display 108 and allow the user to select an application to be selected and executed, instead of sequentially performing automatic selection and execution (activation of an application) of the application from the search results. Alternatively, similarly to each of the examples, it may be possible to perform a series of processes of automatically selecting and executing a single application on the basis of the priority. Therefore, for example, if display of the display 108 is turned off (a state in which the power is not supplied), nothing is displayed on the background screen when the item images 50 are displayed as illustrated in FIG. 11. In contrast, if a certain content is already replayed on the display 108, it may be possible to display the item images 50 while continuously displaying the certain content.

Moreover, the display control unit 166 may additionally display an image 52, such as "please speak an item to be selected", for requesting to select an application on the display 108 as illustrated in FIG. 11. Here, as illustrated in FIG. 11, it is possible to more reliably request speech input using the reading items by matching a display mode of characters for requesting the speech input on the image 52 and display modes of the reading items (for example, application names) on the item images 50, or by displaying an icon of a microphone in the vicinity of the characters for requesting the speech input on the image 52.

Then, if the user performs speech input (selection) of an application name (selection of an application), the control unit 160 activates (executes) the selected application and causes the display 108 to display an application screen. Here, if the application is automatically selected and executed in advance, applications that are not executed may be displayed on the item images 50, and a different application may be selected by the user on the basis of the item images.

Meanwhile, even after the user has selected the application, the application has been activated, and the application screen (content) has been displayed on the display 108, it may be possible to display the item images 50 representing the search results and the image 52 for requesting speech input on the display 108. With this configuration, it is possible to support switching between applications by speech input performed again.

3-9. Ninth Example: "Timer Recording/Viewing, Content Deletion" When Power Supply is Turned Off The information processing apparatus 100 according to the present example is able to perform timer recording, timer viewing, and content deletion in response to speech input from the user, even if the display 108 is turned off. This will be described in detail below with reference to FIG. 12 and FIG. 13.

Timer Recording/Viewing

FIG. 12 is a flowchart illustrating an example of the flow of an operation process for setting timer recording or timer viewing when a power supply is turned off according to the present example. Here, it is assumed that "when the power supply is turned off" indicates the standby state in which at least speech detection by the microphone 102 and speech recognition by the speech recognition unit 130 are available (a state in which power is supplied to the processor 112 and the microphone 102) and the display 108 is turned off (power is not supplied to the power supply of the display 108).

As illustrated in FIG. 12, first, the information processing apparatus 100 detects an uttered speech related to timer recording/viewing, such as "execute timer recording of oo (a title name of a program)", or "execute timer viewing of oo (a title name of a program)" (Step S503). When a predetermined call, such as a call for an agent, is given by the user, the speech recognition unit 130 of the information processing apparatus 100 may recognize an uttered speech that follows the call and identify a command for timer recording, timer viewing, or the like.

Subsequently, the control unit 160 turns on the power supply of the information processing apparatus 100 except for the display 108 (Step S506).

Then, the application unit 150 executes timer recording or timer viewing on the basis of a speech recognition result obtained by the speech recognition unit 130 (Step S509). Timer recording/viewing information is stored in, for example, the memory 105. Furthermore, if it is possible to identify an utterer (user) through the speech recognition or the like, the application unit 150 may execute timer recording/viewing for the user (by associating information on the user as a subscriber).

In this manner, in the present example, it is possible to execute timer recording/viewing by speech input without turning on the power supply of the display 108 and without performing operation using a display screen, so that the user is able to promptly perform timer recording/viewing without waiting for the display 108 to be turned on. Meanwhile, when receiving timer recording/viewing, the information processing apparatus 100 may give a feedback to the user by voice using the utterer 109 (for example, return a response speech, such as "timer recording/viewing is set"). Furthermore, timer recording/viewing may be set such that an actual recording and viewing process is performed by an external apparatus that is connected to the information processing apparatus 100.

Then, the control unit 160 turns off the power supply of the information processing apparatus 100 (Step S512). Here, a state in which the power supply is turned off indicates a certain power supply state in which at least a function to execute timer recording/viewing and a speech recognition function is available (in other words, power supply is performed to the extent that these functions can be executed).

Content Deletion

FIG. 13 is a flowchart illustrating an example of the flow of an operation process of deleting a content when a power supply is turned off according to the present example.

As illustrated in FIG. 13, first, the information processing apparatus 100 detects an uttered speech, such as "delete oo (a title name of a recorded program)", related to deletion of a recorded program (Step S603). When a predetermined call, such as a call for an agent, is given by the user, the speech recognition unit 130 of the information processing apparatus 100 may recognize an uttered speech that follows the call and identify a command for deleting a content or the like.

Subsequently, the control unit 160 turns on the power supply of the information processing apparatus 100 except for the display 108 (Step S606).

Then, the application unit 150 executes deletion of the specified recorded program on the basis of a speech recognition result obtained by the speech recognition unit 130 (Step S609). Recorded program data is stored in, for example, the memory 105. Meanwhile, even if the recorded program data is stored in an external apparatus that is connected to the information processing apparatus 100, the application unit 150 may be able to delete the recorded program stored in the external apparatus.

In this manner, in the present example, it is possible to execute deletion of a recorded program by speech input without turning on the display 108 and without performing operation using a display screen, so that the user is able to promptly delete the recorded program (content) without waiting for the display 108 to be turned on. Meanwhile, when receiving deletion of a recorded program, the information processing apparatus 100 may give a feedback to the user by voice using the utterer 109 (for example, return a response speech, such as "oo (a title name of the recorded program) is deleted").

Then, the control unit 160 turns off the power supply of the information processing apparatus 100 (Step S612). Here, a state in which the power supply is turned off indicates a certain power supply state in which at least a speech recognition function is available (in other words, power supply is performed to the extent that this function can be executed).

3-10. Supplemental Explanation

Each of the examples as described above may be implemented in a combined manner.

For example, when a channel is automatically selected by speech input of a channel name as described in the first example, and the item images 30 are displayed as the search results as illustrated in FIG. 5, it may be possible to receive speech input of the program names displayed on the item images 30. In this case, the information processing apparatus 100 searches for a content that matches the program name that is given by speech input, from among currently viewable contents. If a plurality of sequential contents are retrieved, the information processing apparatus 100 forms a list of the contents in ascending order of numbers as described above in the sixth embodiment, and select and automatically replay a content with the smallest number except for contents that are determined as being already viewed or that are determined as being almost viewed until closing credits or the like. Furthermore, by combining the process of selecting and searching for currently broadcasted programs and recorded programs corresponding to speech input of a program name as described in the second example and the process of searching for and selecting currently receivable contents including Internet-distributed contents corresponding to speech input that designates the whole or a part of a currently receivable content as described in the third example, it may be possible to perform a process of searching for and selecting currently receivable contents including currently broadcasted programs, recorded programs, and Internet-distributed contents in response to input of a program name.

Moreover, while explanation has been given based mainly on a video content, such as a broadcast program, as a content to be searched for and executed, but types of contents are not specifically limited as long as the contents can be executed by a device or an apparatus that may be implemented by the present invention. For example, a content to be replayed may be an audio content (for example, music), and an application executable on the information processing apparatus 100 replays the music. Furthermore, a target to be retrieved based on the priority may be an audio content or may be an application that replays an audio content. In these cases, a single piece of music or application is selected based on the same procedure as any of the examples as described above or based on a combination of the procedures, and item images including, as options, non-selected pieces of music or applications are displayed on the display 108. It may be possible to display, on the display 108, an album art image (jacket image) of the music, an UI image of the application, or the like as the selected content. The channel described in the examples as described above may be a channel of a radio or a music distribution station that broadcasts an audio content, such as music. A different kind of content, such as a still image content or a WEB page, may be processed in the same procedures as those described in the examples.

4. Conclusion

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the appended claims, and it should be understood that they will naturally come under the technical scope of the present disclosure.

For example, it may be possible to generate a computer program that causes hardware, such as the CPU, the ROM, and the RAM, incorporated in the information processing apparatus 100 as described above to implement the functions of the information processing apparatus 100. Further, a computer readable storage medium that stores therein the computer program is also provided.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A receiving apparatus comprising:
  a control unit that performs
  a search process of searching for one of a channel and a
    content on the basis of a phrase that is recognized from
    an uttered speech of a user,
  a process of selecting one of a single channel and a single
    content from among a plurality of channels and a
    plurality of contents obtained through the search process,
  a process of displaying, on a display unit, one of the
    selected content and a content that is being broadcasted
    on the selected channel, and
  a process of displaying, as options, item images representing a plurality of channels or a plurality of contents
    that are obtained through the search process on the
    display unit.

(2)

The receiving apparatus according to (1), wherein the control unit displays, on the display unit, an image for requesting speech input at the time of selection from the plurality of channels or the plurality of contents.

(3)

The receiving apparatus according to (2), wherein the image for requesting the speech input includes a descriptive text for requesting speech input of reading items that are displayed on the item images.

(4)

The receiving apparatus according to (3), wherein the descriptive text on the image for requesting the speech input includes a character in a same display mode as display modes of the reading items that are displayed on the item images.

(5)

The receiving apparatus according to any one of (1) to (4), wherein the control unit selects one of the channel and the content in accordance with priority that is based on at least one of a viewing history and preference information on the user and time information.

(6)

The receiving apparatus according to (5), wherein the control unit performs a process of displaying item images representing a plurality of channels or a plurality of contents that are obtained through the search process, in ascending order of priority.

(7)

The receiving apparatus according to any one of (1) to (6), wherein the content is one of a broadcast program, a recorded program, and a distributed content that is distributed via Internet.

(8)

The receiving apparatus according to (7), further comprising:

a receiving unit that receives a broadcast program that is transmitted from a broadcast station; and a communication unit that receives a distributed content that is distributed via Internet.

(9)

The receiving apparatus according to (3) or (4), wherein the reading items are one of a channel name and a content name.

(10)

The receiving apparatus according to any one of (1) to (9), wherein when the phrase is related to one of external input and an application, the control unit performs a process of displaying, as options, item images indicating one of names of standards of retrieved external input, names of external apparatuses as external input sources, and names of applications on the display unit, and thereafter displaying an image of one of external input and an application that is selected by speech input from the user on the display unit.

(11)

The receiving apparatus according to any one of (1) to (10), wherein when a power supply of the display unit is turned off, the control unit performs a process of turning on the power supply of the display unit, and thereafter displaying one of the selected content and a content that is being broadcasted on the selected channel.

(12)

The receiving apparatus according to any one of (1) to (11), wherein when the phrase is related to one of a name of a channel and a name of a program, the control unit performs a process of searching for one of a channel and a program, selecting a single program with highest priority that is based on one of a person and a time from among broadcast programs and recorded programs corresponding to one of a retrieved channel and a retrieved program, and displaying the selected program on the display unit.

(13)

The receiving apparatus according to (12), wherein the control unit reduces priority of a program that is already viewed by the user as compared to priority of a content that is not yet viewed.

(14)

The receiving apparatus according to any one of (1) to (13), wherein the control unit starts a speech reception process in response to a signal from an external operation terminal, and the speech reception process is performed by a microphone included in the external operation terminal.

(15)

The receiving apparatus according to (14), wherein the external operation terminal is one of a remote controller and a mobile terminal that includes one of a physical key and a virtual key for performing operation of starting the speech reception process.

(16)

The receiving apparatus according to any one of (1) to (15), wherein when the phrase designates an external device that is not activated, the control unit performs a process of activating the external device and displaying a home screen of the external device on the display unit.

(17)

The receiving apparatus according to any one of (1) to (16), wherein the content is an audio content, and the process of displaying the selected content on the display unit is a process of displaying an image representing the audio content on the display unit.

(18)

The receiving apparatus according to any one of (1) to (17), wherein the control unit performs a process of displaying the item images on the display unit for a predetermined time.

(19)

The receiving apparatus according to any one of (1) to (18), wherein the control unit displays, on the item images, information indicating one of broadcast states and viewing states of the respective contents.

(20)

A control method implemented by a processor, the control method comprising:

searching for one of a channel and a content on the basis of a phrase that is recognized from an uttered speech of a user;

selecting one of a single channel and a single content from among a plurality of channels and a plurality of contents obtained at the searching;

displaying, on a display unit, one of the selected content and a content that is being broadcasted on the selected channel; and displaying, as options, item images representing a plurality of channels or a plurality of contents that are obtained at the searching on the display unit.

REFERENCE SIGNS LIST

100 information processing apparatus
101 camera
102 microphone
103 input device
104 communication interface (I/F)
105 memory
106 tuner
107 decoder
108 display
109 utterer
111 bus
112 processor
120 speech acquisition unit
130 speech recognition unit
140 feature database
150 application unit
160 control unit
162 search control unit
164 selection control unit
166 display control unit
172 viewing history database
174 preference database

The invention claimed is:

1. A receiving apparatus comprising:

control circuitry configured to perform a search process of searching for one of a channel or a content on the basis of a phrase that is recognized from uttered speech;

a process of selecting one of a single channel or a single content from among, respectively, a plurality of channels obtained through the search process or a plurality of contents obtained through the search process;

a process of displaying, on a display, one of the selected content or a content that is being broadcasted on the selected channel;

a process of displaying, as options, item images representing one of the plurality of channels or the plurality of contents, wherein each of the item images is displayed on the display with the selected content or the content that is being broadcasted on the selected channel and includes a reading item, in a form of character information displayed on the display, for speech input corresponding to one of the plurality of channels or one of the plurality of contents, a display mode of the reading item matching a display mode of an indicator in a text for explaining the reading item; and a process of displaying, on the display, another content corresponding to the one of the plurality of channels or the one of the plurality of contents on the basis of an uttered speech corresponding to the reading item.

2. The receiving apparatus according to claim 1, wherein the control circuitry is configured to display, on the display, an image for requesting speech input for selection from the plurality of channels or the plurality of contents.

3. The receiving apparatus according to claim 2, wherein the image for requesting the speech input includes a descriptive text for requesting speech input of reading items that are displayed on the item images.

4. The receiving apparatus according to claim 3, wherein the descriptive text on the image for requesting the speech input includes a character in a same display mode as display modes of the reading items that are displayed on the item images.

5. The receiving apparatus according to claim 1, wherein the control circuitry is configured to select one of the single channel or the single content in accordance with priority that is based on at least one of a viewing history and preference information on a user and time information.

6. The receiving apparatus according to claim 5, wherein the control circuitry is configured to perform a process of displaying item images in ascending order of priority.

7. The receiving apparatus according to claim 1, wherein the selected content is one of a broadcast program, a recorded program, or a distributed content that is distributed via Internet.

8. The receiving apparatus according to claim 7, further comprising:
receiving circuitry configured to receive a broadcast program that is transmitted from a broadcast station; and
communication circuitry configured to receive a distributed content that is distributed via Internet.

9. The receiving apparatus according to claim 3, wherein the reading items are one of a channel name or a content name.

10. The receiving apparatus according to claim 1, wherein when the phrase is related to one of external input or an application, the control circuitry is configured to perform a process of displaying, as options, item images indicating one of names of standards of retrieved external input, names of external apparatuses as external input sources, or names of applications on the display, and thereafter displaying an image of one of external input or an application that is selected by speech input on the display.

11. The receiving apparatus according to claim 1, wherein when a power supply of the display is turned off, the control circuitry performs a process of turning on the power supply of the display, and thereafter displaying one of the selected content or a content that is being broadcasted on the selected channel.

12. The receiving apparatus according to claim 1, wherein when the phrase is related to one of a name of a channel or a name of a program, the control circuitry performs a process of searching for one of a channel or a program, selecting a single program with highest priority that is based on one of a person or a time from among broadcast programs and recorded programs corresponding to one of a retrieved channel or a retrieved program, and displaying the selected program on the display.

13. The receiving apparatus according to claim 12, wherein the control circuitry is configured to reduce priority of a program that is already viewed by a user as compared to priority of a content that is not yet viewed.

14. The receiving apparatus according to claim 1, wherein
the control circuitry is configured to start a speech reception process in response to a signal from an external operation terminal, and
the speech reception process is performed by a microphone included in the external operation terminal.

15. The receiving apparatus according to claim 14, wherein the external operation terminal is one of a remote controller and a mobile terminal that includes one of a physical key and a virtual key for performing operation of starting the speech reception process.

16. The receiving apparatus according to claim 1, wherein when the phrase designates an external device that is not activated, the control circuitry performs a process of activating the external device and displaying a home screen of the external device on the display.

17. The receiving apparatus according to claim 1, wherein
the content is an audio content, and
the process of displaying the selected content on the display is a process of displaying an image representing the audio content on the display.

18. The receiving apparatus according to claim 1, wherein the control circuitry is configured to perform a process of displaying the item images on the display for a predetermined time.

19. The receiving apparatus according to claim 1, wherein the control circuitry is configured to display, on the item images, information indicating one of broadcast states or viewing states of the respective contents.

20. A control method implemented by a processor, the control method comprising:
searching for one of a channel or a content on the basis of a phrase that is recognized from an uttered speech;
selecting one of a single channel or a single content from among, respectively, a plurality of channels obtained by the searching or a plurality of contents obtained by the searching;
displaying, on a display, one of the selected content or a content that is being broadcasted on the selected channel;
displaying, as options, item images representing one of the plurality of channels or the plurality of contents, wherein each of the item images is displayed on the display with the selected content or the content that is being broadcasted on the selected channel and includes a reading item, in a form of character information displayed on the display, for speech input corresponding to one of the plurality of channels or one of the plurality of contents, a display mode of the reading item matching a display mode of an indicator in a text for explaining the reading item; and
displaying, on the display, another content corresponding to the one of the plurality of channels or the one of the plurality of contents on the basis of an uttered speech corresponding to the reading item.

21. A receiving apparatus comprising:
control circuitry configured to perform a search process of searching for one of a channel or a content on the basis of a phrase that is recognized from uttered speech;
a process of displaying, as options, item images representing one of a plurality of channels or a plurality of contents obtained through the search process, wherein each of the item images includes a reading item, in a form of character information displayed on the display, for speech input corresponding to one of the plurality of channels or one of the plurality of contents, a display mode of the reading item matching a display mode of an indicator in a text for explaining the reading item; and
a process of displaying, on the display, a content corresponding to the one of the plurality of channels or the one of the plurality of contents on the basis of an uttered speech corresponding to the reading item.

22. The receiving apparatus according to claim 21, wherein the control circuitry is configured to display, on the display, an image for requesting speech input for selection from the plurality of channels or the plurality of contents.

23. The receiving apparatus according to claim 22, wherein the image for requesting the speech input includes a descriptive text for requesting speech input of reading items that are displayed on the item images.

24. The receiving apparatus according to claim 23, wherein the descriptive text on the image for requesting the speech input includes a character in a same display mode as display modes of the reading items that are displayed on the item images.

25. The receiving apparatus according to claim 21, wherein the control circuitry is configured to select one of the single channel or the single content in accordance with priority that is based on at least one of a viewing history and preference information on a user and time information.

26. A control method implemented by a processor, the control method comprising:
searching for one of a channel or a content on the basis of a phrase that is recognized from an uttered speech;
displaying, as options, item images representing one of a plurality of channels or a plurality of contents obtained through the search process, wherein each of the item images includes a reading item, in a form of character information displayed on the display, for speech input corresponding to one of the plurality of channels or one of the plurality of contents, a display mode of the reading item matching a display mode of an indicator in a text for explaining the reading item; and
displaying, on the display, a content corresponding to the one of the plurality of channels or the one of the plurality of contents on the basis of an uttered speech corresponding to the reading item.

* * * * *